US010033980B2

(12) United States Patent
Boyd et al.

(10) Patent No.: US 10,033,980 B2
(45) Date of Patent: Jul. 24, 2018

(54) DETERMINING STEREO DISTANCE INFORMATION USING IMAGING DEVICES INTEGRATED INTO PROPELLER BLADES

(71) Applicant: Amazon Technologies, Inc., Seattle, WA (US)

(72) Inventors: Scott Patrick Boyd, Seattle, WA (US); Barry James O'Brien, Seattle, WA (US); Joshua John Watson, Seattle, WA (US); Scott Michael Wilcox, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/243,844

(22) Filed: Aug. 22, 2016

(65) Prior Publication Data

US 2018/0054604 A1 Feb. 22, 2018

(51) Int. Cl.
*G06K 9/00* (2006.01)
*H04N 13/00* (2018.01)
(Continued)

(52) U.S. Cl.
CPC ......... *H04N 13/0022* (2013.01); *B64C 11/00* (2013.01); *B64C 39/02* (2013.01); *B64C 39/024* (2013.01); *B64D 31/00* (2013.01); *B64D 47/08* (2013.01); *G01C 3/10* (2013.01); *G03B 35/02* (2013.01); *G06T 7/70* (2017.01); *H04N 13/0239* (2013.01); *B64C 2201/108* (2013.01); *B64C 2201/127* (2013.01); *B64C 2201/165* (2013.01)

(58) Field of Classification Search
CPC .................... B64C 39/024; H04N 13/0022
See application file for complete search history.

(56) References Cited

U.S. PATENT DOCUMENTS 7,463,305 B2 * 12/2008 Wada ................... F16M 11/105
348/218.1
9,692,953 B2 * 6/2017 Xiong .................. H04N 5/2254
(Continued)

FOREIGN PATENT DOCUMENTS

WO 2004056090 A1 7/2004

OTHER PUBLICATIONS

International Search Report and Written Opinion for PCT Application No. PCT/US2017/045597 dated Nov. 27, 2017.
(Continued)

*Primary Examiner* — Oneal R Mistry
(74) *Attorney, Agent, or Firm* — Athorus, PLLC

(57) ABSTRACT

A propeller provided on an aerial vehicle may include a digital camera or other imaging device embedded into a surface of one of the blades of the propeller. The digital camera may capture images while the propeller is rotating at an operational speed. Images captured by the digital camera may be processed to recognize one or more objects therein, and to determine ranges to such objects by stereo triangulation techniques. Using such ranges, a depth map or other model of the surface features in an environment in which the aerial vehicle is operating may be defined and stored or used for any purpose. A propeller may include digital cameras or other imaging devices embedded into two or more blades, and may also use such images to determine ranges to objects by stereo triangulation techniques.

20 Claims, 17 Drawing Sheets

(51) Int. Cl.
*G06T 7/70* (2017.01)
*B64C 39/02* (2006.01)
*B64D 31/00* (2006.01)
*B64D 47/08* (2006.01)
*H04N 13/02* (2006.01)
*B64C 11/00* (2006.01)
*G01C 3/10* (2006.01)
*G03B 35/02* (2006.01)

(56) References Cited

U.S. PATENT DOCUMENTS

| | | | |
|---|---|---|---|
| 2015/0161798 A1* | 6/2015 | Venkataraman | G01P 3/38 348/47 |
| 2015/0252789 A1* | 9/2015 | Bunge | F03D 17/00 382/107 |

OTHER PUBLICATIONS

Stasicki Boleslaw et al., "In-flight measurements of aircraft propeller deformation by means of an autarkic fast rotating imaging system", Mar. 4, 2015, Optomechatronic Micro/Nano Devices and Components III : Oct. 8-10, 2007, Lausanne, Switzerland; Proceedings of the SPIE, SPIE, Bellingham, WA, pp. 93022S-93022S, XP060045890, ISBN: 978-1-62841-730-2 section 2.2; figures 4,5.

* cited by examiner

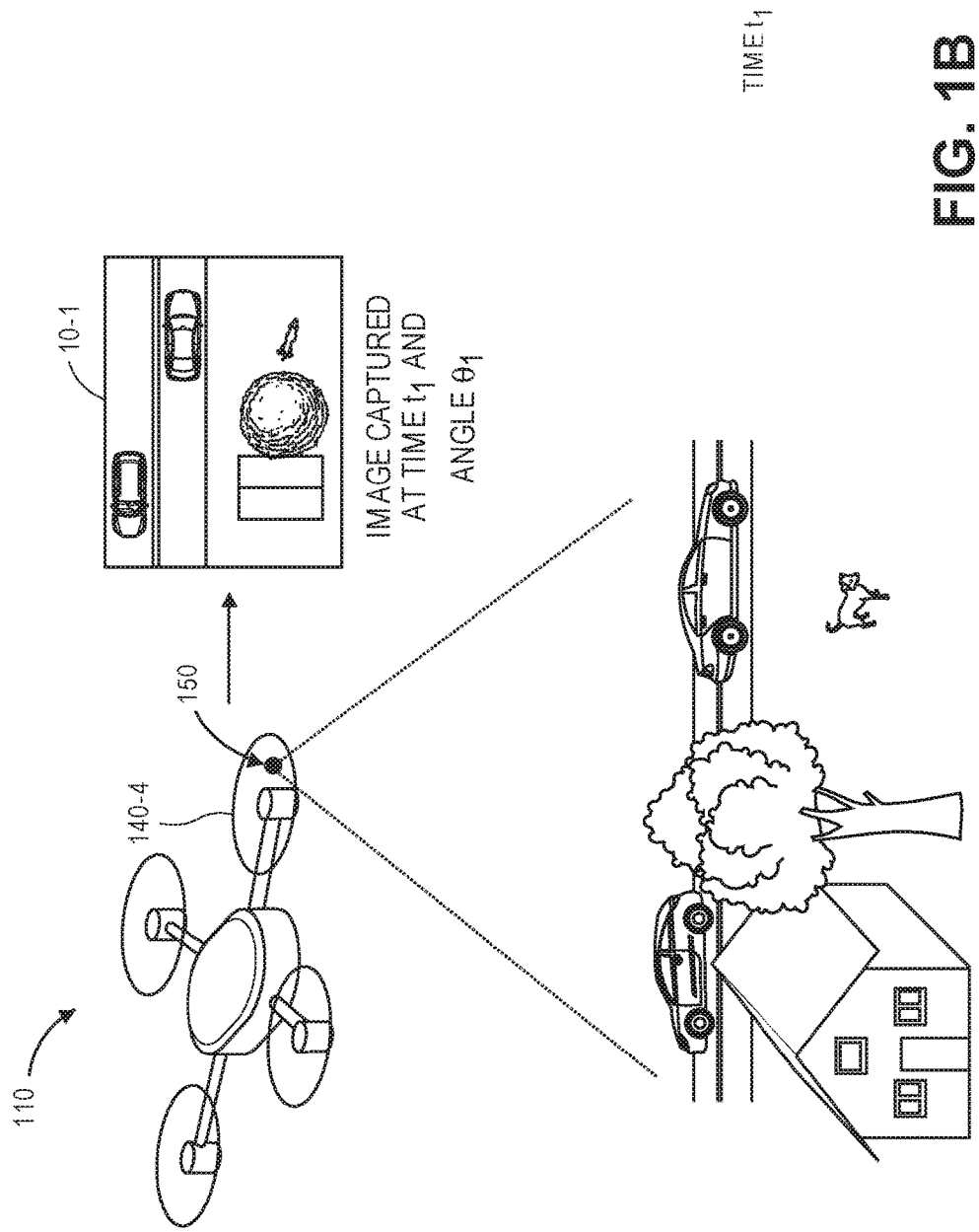

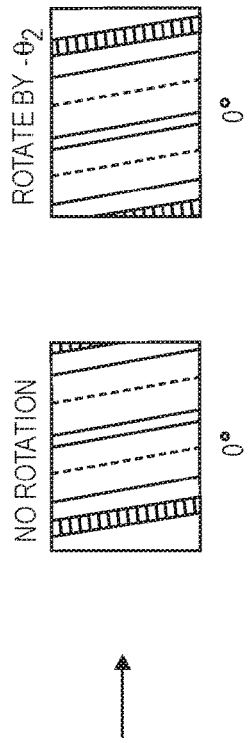
FIG. 5A
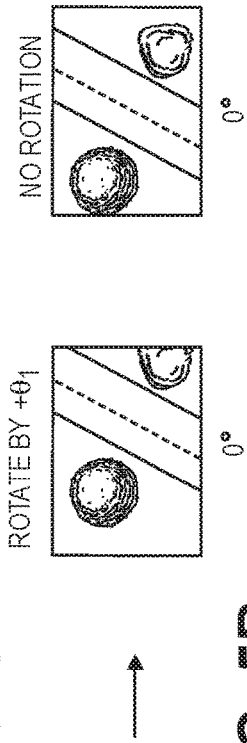
FIG. 5B
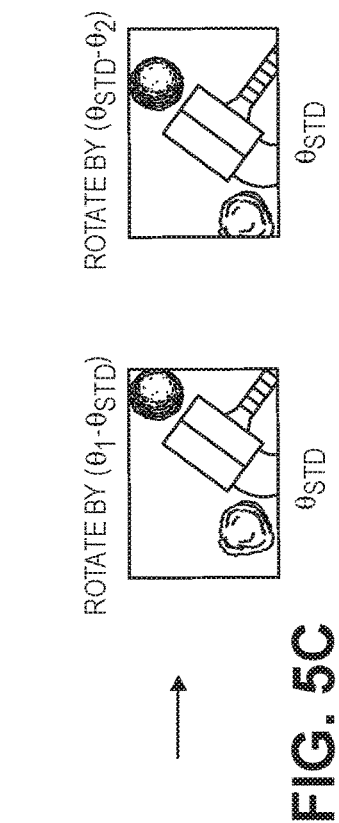
FIG. 5C
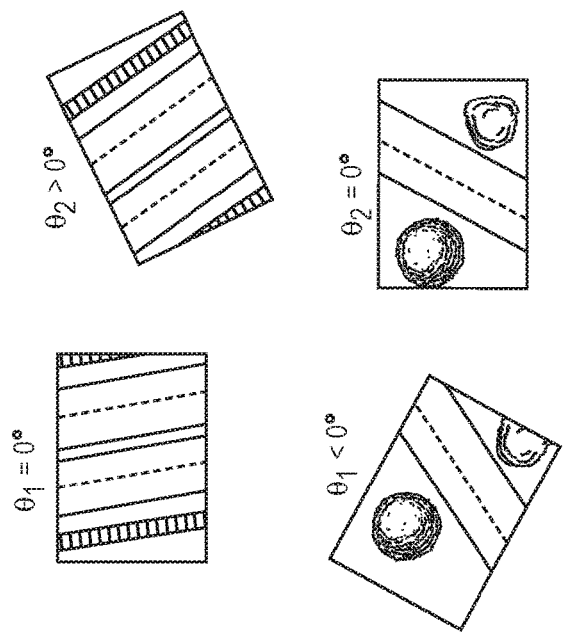

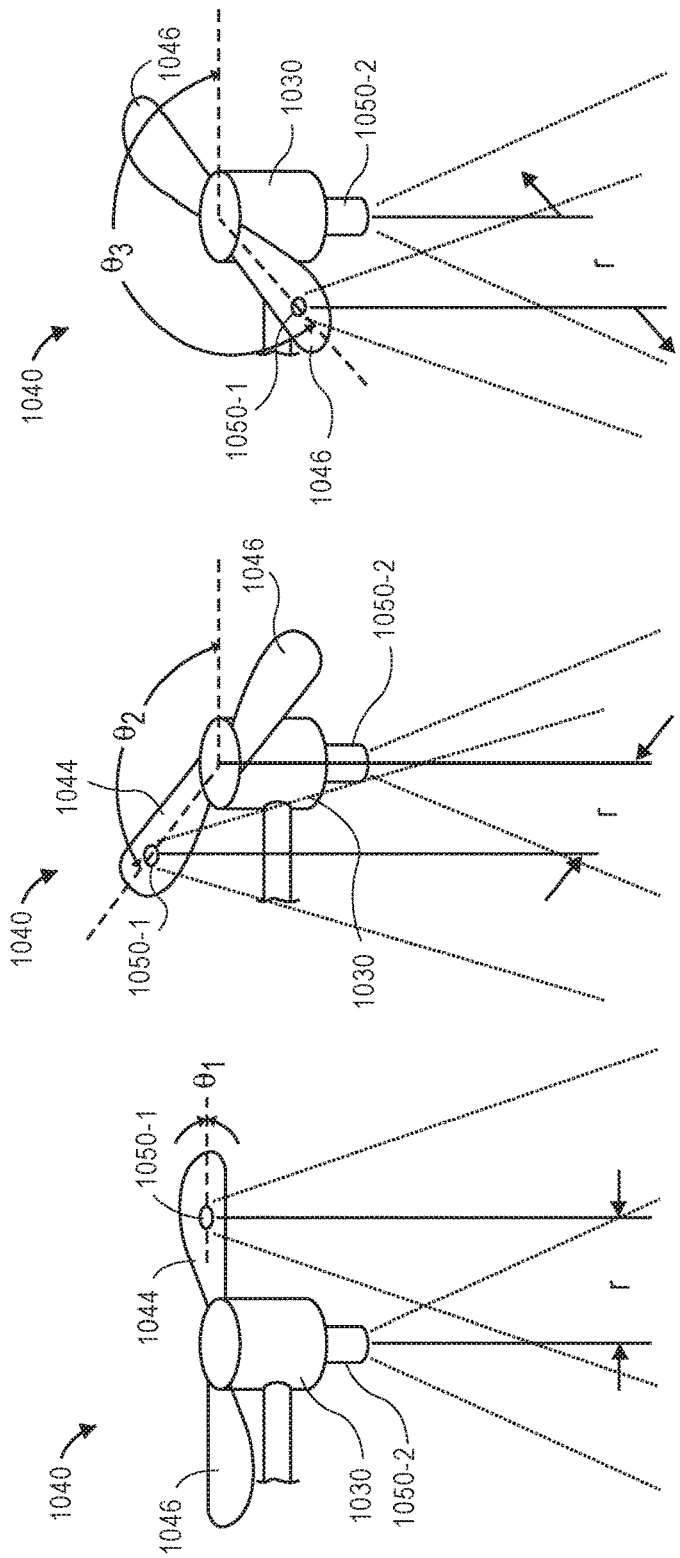

DETERMINING STEREO DISTANCE INFORMATION USING IMAGING DEVICES INTEGRATED INTO PROPELLER BLADES

BACKGROUND

Many aerial vehicles such as airplanes, helicopters or other airships are configured to operate in two or more flight modes, including a forward flight mode (or a substantially horizontal flight mode) in which the aerial vehicle travels from one point in space (e.g., a land-based point or, alternatively, a sea-based or air-based point) to another point by traveling over at least a portion of the Earth. An aerial vehicle may also be configured to engage in a vertical flight mode in which the aerial vehicle travels in a vertical or substantially vertical direction from one altitude to another altitude (e.g., upward or downward, from a first point on land, on sea or in the air to a second point in the air, or vice versa) substantially normal to the surface of the Earth, or hovers (e.g., maintains a substantially constant altitude), with an insubstantial change in horizontal or lateral position. An aerial vehicle may be further configured to engage in both forward and vertical flight modes, e.g., in a hybrid mode in which a position of the aerial vehicle changes in both horizontal and vertical directions. Forces of lift and thrust are commonly applied to aerial vehicles using one or more propellers, or devices having blades that are mounted about a hub and joined to a shaft or other component of a prime mover, which may rotate at angular velocities of thousands of revolutions per minute during flight operations.

Aerial vehicles (including, specifically, unmanned aerial vehicles, or UAVs) are frequently equipped with one or more imaging devices such as digital cameras which may be used to aid in the guided or autonomous operation of an aerial vehicle, to determine when the aerial vehicle has arrived at or passed over a given location, or is within range of one or more structures, features, objects or humans (or other animals), to conduct surveillance or monitoring operations, or for any other purpose. Outfitting an aerial vehicle with one or more imaging devices typically requires installing housings, turrets or other structures or features by which the imaging devices may be mounted to the aerial vehicle. Such structures or features add weight to the aerial vehicle, and may increase the amount or extent of drag encountered during flight, thereby exacting an operational cost from the aerial vehicle in exchange for the many benefits that imaging devices may provide.

Stereo ranging (or stereo triangulation) is a process by which distances or ranges to objects may be determined from digital images depicting such objects that are captured using imaging devices, such as digital cameras, that are separated by a fixed distance. For example, by processing pairs of images of an environment that are captured by imaging devices, ranges to points expressed in both of the images (including but not limited to points associated with specific objects) may be determined by finding a virtual intersection of pairs of lines extending from the respective lenses or sensors of the imaging devices through representations of such points within each of the images. If each of the images of the environment is captured substantially simultaneously, or if conditions of the environment are substantially unchanged when each of the images is captured, a range to a single point within the environment at a given time may be determined based on a baseline distance between the lenses or sensors of the imaging devices that captured such images and a disparity, or a distance between corresponding representations of a single point in space expressed within both of the images when the images are superimposed upon one another. Such processes may be completed for any number of points in three-dimensional space that are expressed in both of the images, and a model of such points, e.g., a point cloud, a depth map or a depth model, may be defined accordingly. The model of such points may be updated as pairs of images are subsequently captured and processed to determine ranges to such points.

BRIEF DESCRIPTION OF THE DRAWINGS

FIGS. 1A through 1E are views of aspects of one system for determining stereo distance information using an imaging device integrated into a propeller blade in accordance with embodiments of the present disclosure.

FIGS. 5A, 5B and 5C are views of aspects of one system for determining stereo distance information using imaging devices integrated into propeller blades in accordance with embodiments of the present disclosure.

FIGS. 10A, 10B and 10C are views of aspects of one system for determining stereo distance information using imaging devices integrated into propeller blades in accordance with embodiments of the present disclosure.

DETAILED DESCRIPTION

As is set forth in greater detail below, the present disclosure is directed to determining ranges or distances from operating aerial vehicles to one or more objects. More specifically, the systems and methods disclosed herein are directed to determining stereo distance information using imaging devices (e.g., digital cameras) that have been integrated into blades of one or more operational propellers. The imaging devices may be digital cameras (e.g., black-and-white, grayscale or color cameras) or any other devices for capturing and interpreting light that is reflected from one or more objects. In some embodiments, an imaging device may be embedded, installed or otherwise integrated into a surface of a blade of a propeller for providing lift or thrust to an aerial vehicle, with the imaging device provided at a predetermined distance (e.g., a fixed radius) from a hub of the propeller. When the propeller blade is rotating at an operating angular velocity, e.g., thousands of revolutions per minute or more, a first image may be captured using the imaging device with the propeller blade at a first angular orientation, and a second image may be captured with the propeller blade at a second angular orientation. The first image and the second image may be aligned with respect to one another, and ranges to objects expressed in each of the images may be determined according to one or more stereo ranging algorithms or techniques.

Where an operating angular velocity of a propeller blade is sufficiently high, a single imaging device integrated into the propeller blade may act as two imaging devices, by swinging from a first position in space to a second position in space at within a fraction of a second, and the first image captured by the imaging device in the first position and a second image captured by the imaging device in the second position may be determined to have been captured substantially simultaneously. For example, where a first angular orientation of a blade of a propeller and a second angular orientation of the blade are separated by approximately one hundred eighty degrees (180°), e.g., an opposite direction angle, a baseline distance or separation equal to twice a predetermined distance or radius between a hub of the propeller and an imaging device embedded into the blade may be used to calculate ranges to objects expressed in the each of the images. In other embodiments, imaging devices may be integrated into the same blade of a propeller, or into two or more of the blades of the propeller, at equal or different radii from a hub. Images captured by such devices during the rotation of such propellers may be aligned with respect to one another, and ranges to objects expressed in each of such images may be determined using stereo triangulation, e.g., using one or more computer-based stereo ranging algorithms or techniques.

Figure 1A:
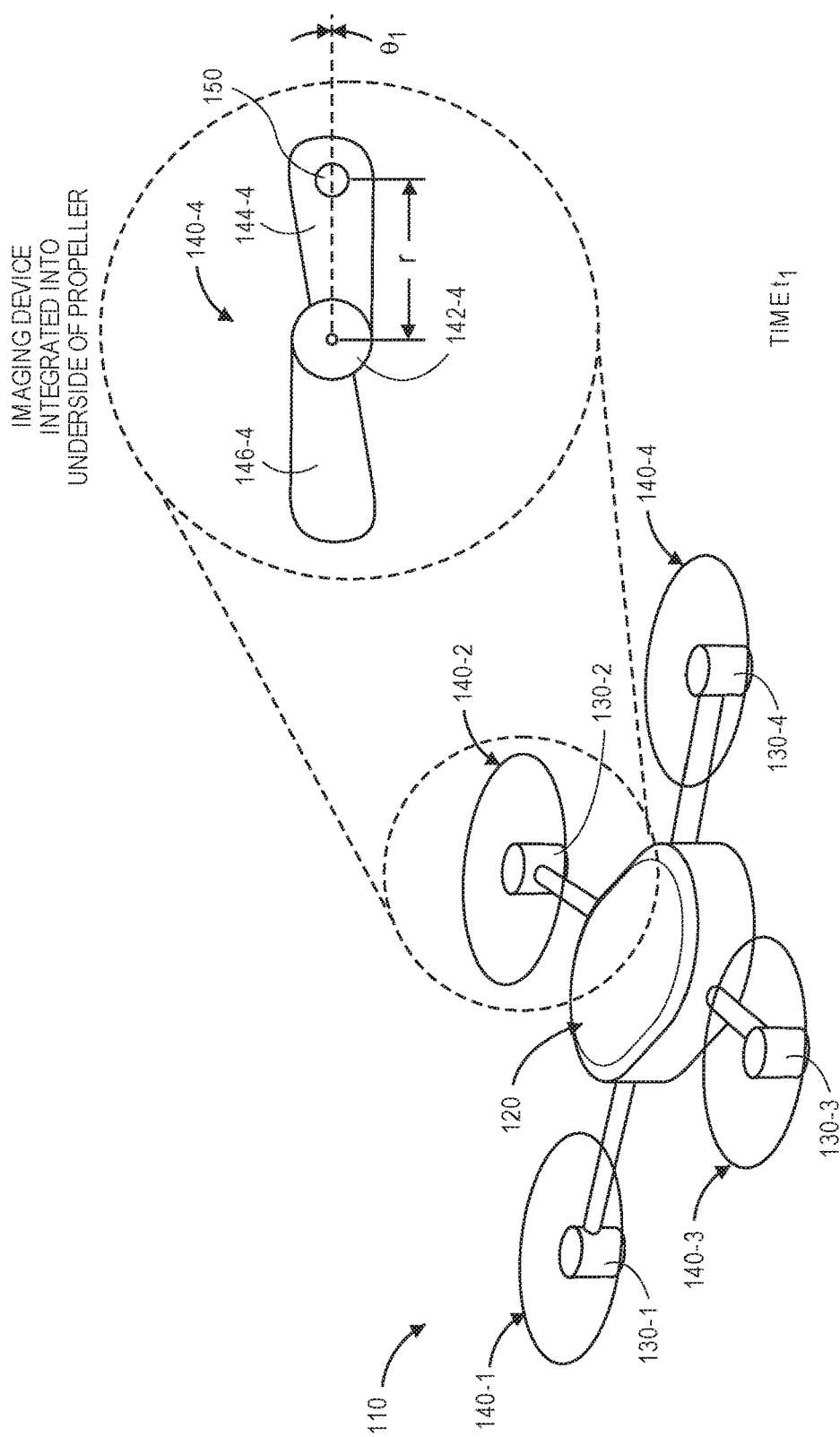

Referring to FIGS. 1A through 1E, a system for determining stereo distance information using an imaging device integrated into a propeller blade in accordance with embodiments of the present disclosure is shown. As is shown in FIG. 1A, an aerial vehicle 110 includes a control center 120, a plurality of motors 130-1, 130-2, 130-3, 130-4 and a plurality of propellers 140-1, 140-2, 140-3, 140-4, with each of the propellers 140-1, 140-2, 140-3, 140-4 rotatably coupled to one of the motors 130-1, 130-2, 130-3, 130-4. The propeller 140-4 includes a hub 142-4, a first blade 144-4 and a second blade 146-4, with an imaging device 150 integrated into an underside of the first blade 144-4 at a radius r from the hub 142-4. As is shown in FIG. 1A, the first blade 144-4 is aligned at an angle $\theta_1$ at time $t_1$.

As is shown in FIG. 1B, the aerial vehicle 110 captures an image 10-1 while the propeller 140-4 is rotating, e.g., under power of the motor 130-4, and with the imaging device 150 oriented substantially downwardly at time $t_1$, as the first blade 144-4 is aligned at the angle $\theta_1$. For example, the imaging device 150 may be configured to capture color or grayscale images of ground-based features in the area in which the imaging device 150 operates (e.g., structures, vehicles or other machines, plant or animal life), or airborne elements that may approach or be located near the aerial vehicle 110 (e.g., birds, other aerial vehicles, or any other airborne objects).

Figure 1C:
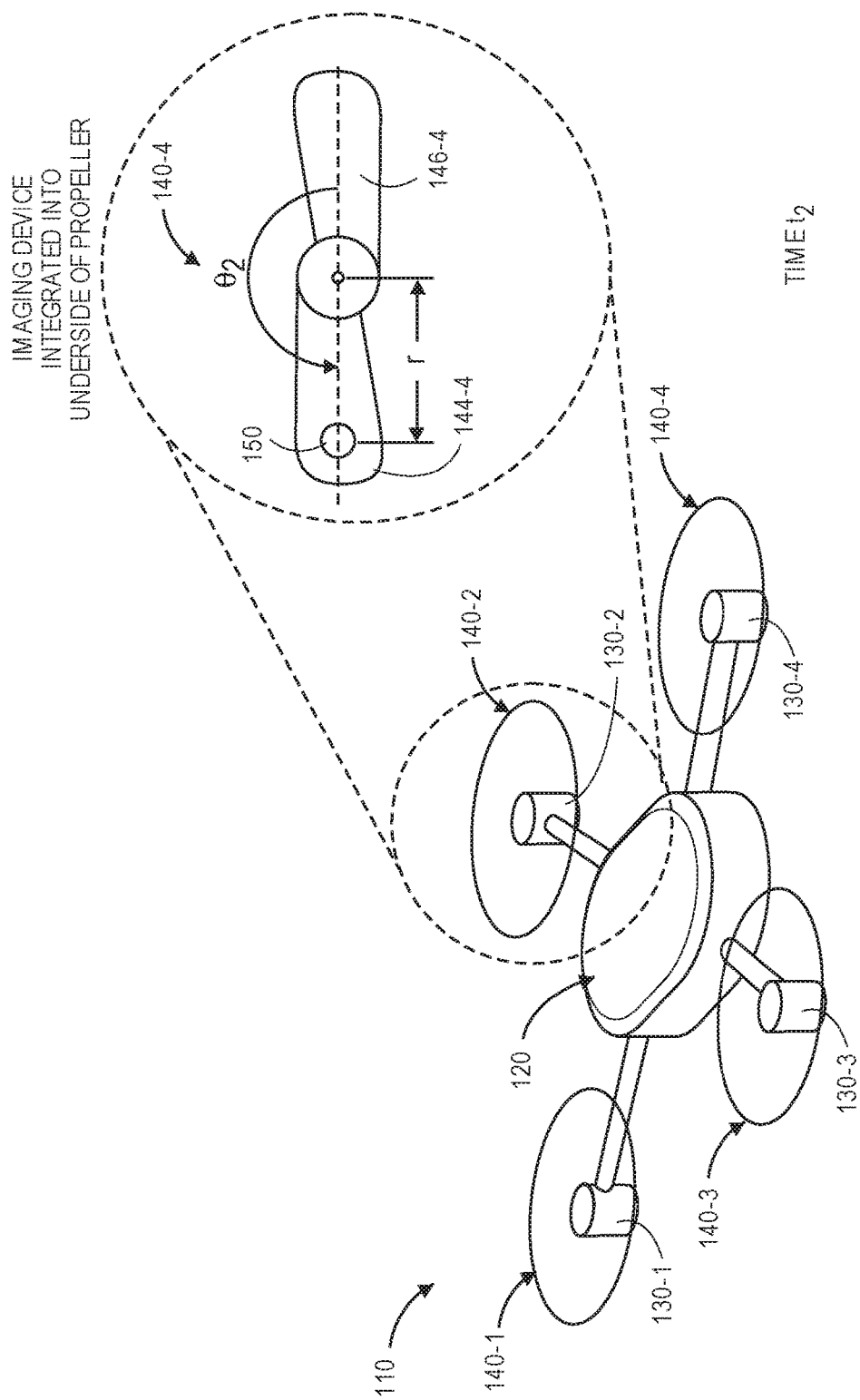
Figure 1D:
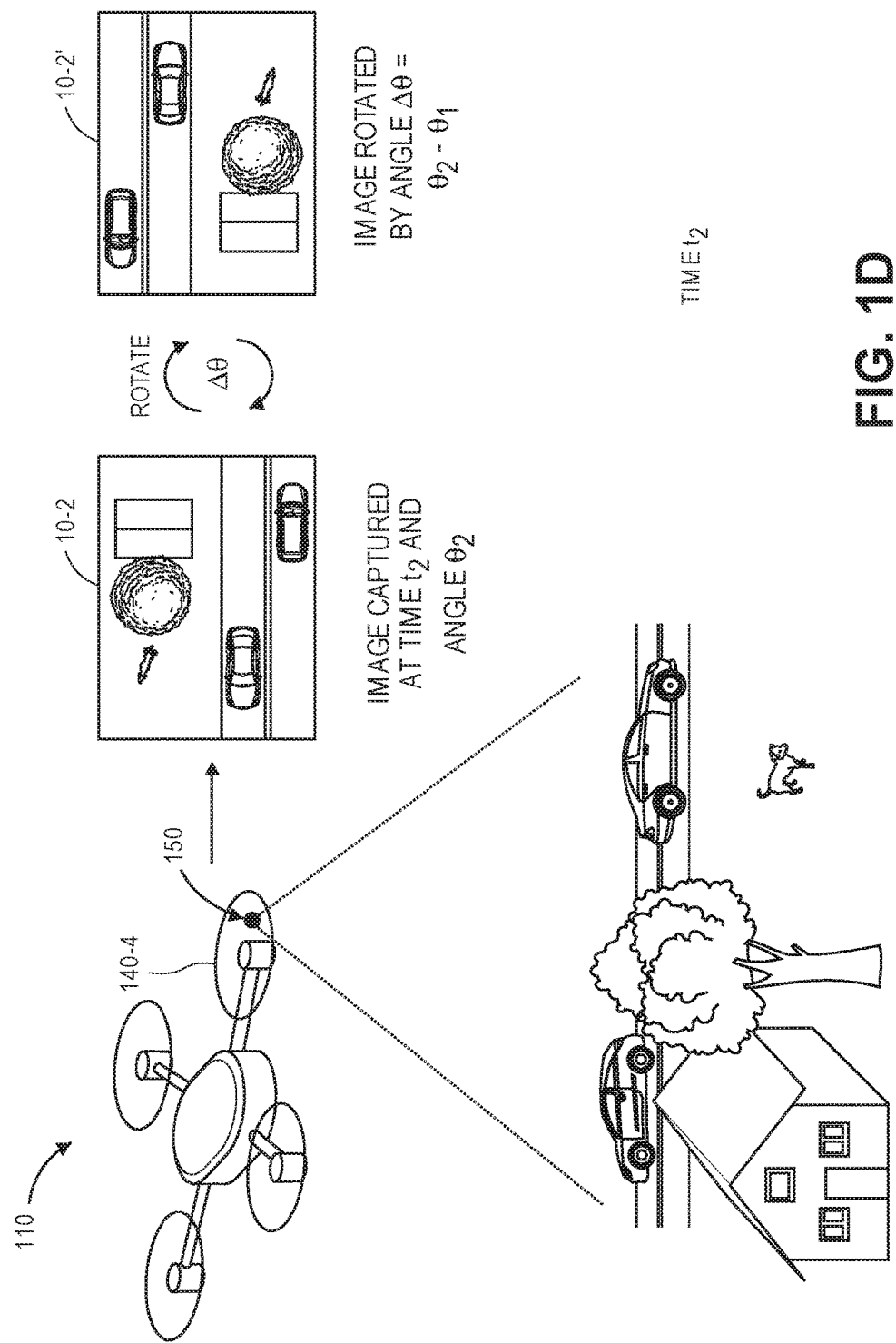

As is shown in FIG. 1C, the first blade 144-4 has completed one half of one revolution and is aligned at an angle $\theta_2$ at time $t_2$. For example, where the propeller 140-4 is spinning at an operational angular velocity of approximately three thousand revolutions per minute (3000 rpm), the first blade 144-4 will revolve from the angle $\theta_1$ to the angle $\theta_2$ in an elapsed time (e.g., $t_2-t_1$) of one six-thousands of a minute ($\frac{1}{6000}$ min), or one one-hundredth of one second (0.01 sec). As is shown in FIG. 1D, while the propeller 140-4 is rotating, and with the first blade 144-4 aligned at the angle $\theta_2$, the aerial vehicle 110 captures an image 10-2 with the imaging device 150 oriented substantially downwardly at time $t_2$. A rotated image 10-2' that coincides with the image 10-1 may be obtained by rotating the image 10-2 by a difference $\Delta\theta$ between the angle $\theta_2$ and the angle $\theta_1$, or $\theta_2-\theta_1$.

Figure 1E:
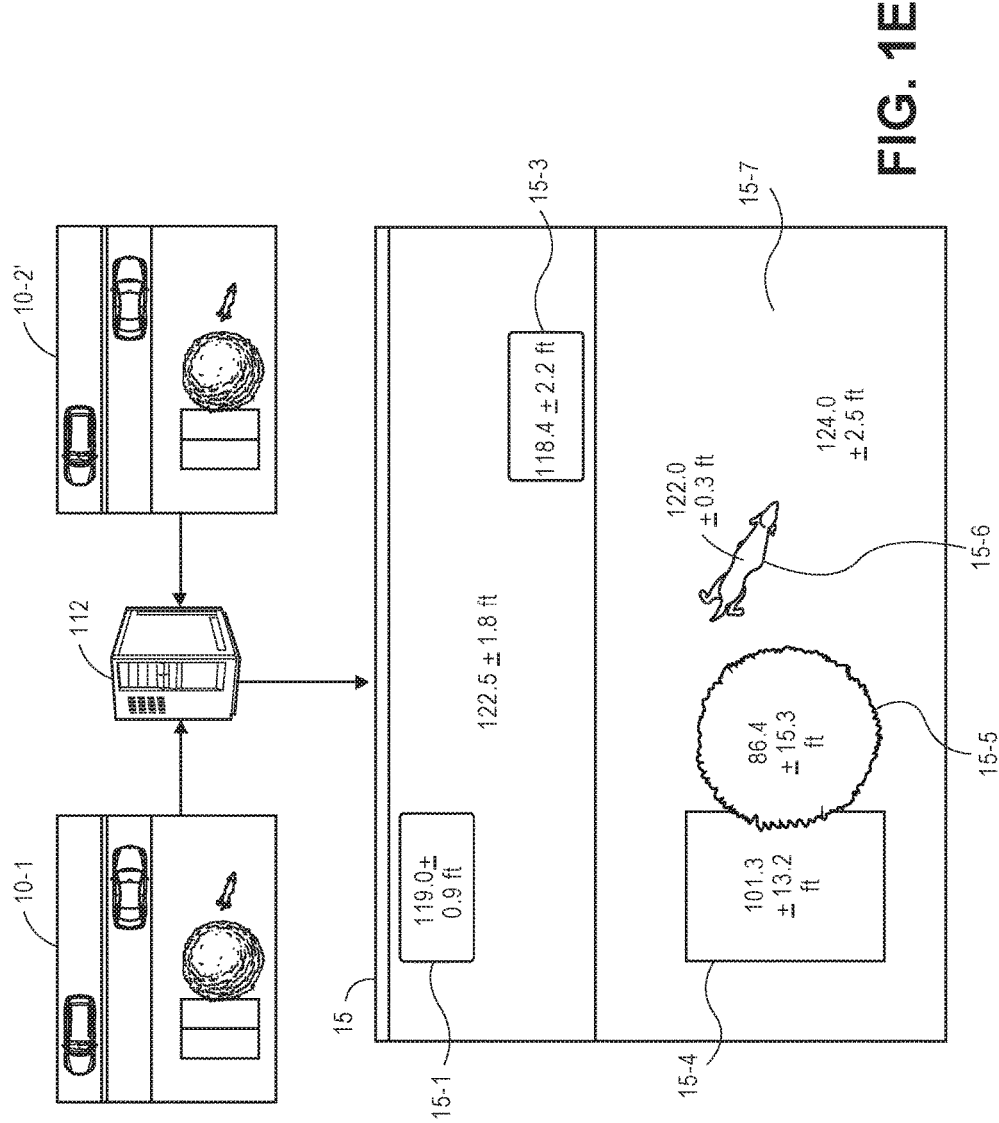

As is discussed above, pairs of images that are captured by one or more imaging devices integrated into surfaces of propellers may be co-aligned and subjected to one or more stereo ranging analyses, in order to determine ranges to any number of points that are expressed in both of the images. For example, ranges to a plurality of points within an environment that appear in each of the images may be combined to form a point cloud, a depth map or another representation of a three-dimensional profile of the environment. As is shown in FIG. 1E, the image 10-1 and the rotated image 10-2' may be provided to a computer device 112 for processing. The computer device 112 may reside on the aerial vehicle 110 or in one or more external locations, including a ground-based or a "cloud"-based facility having one or more servers or other computer devices, a facility residing aboard one or more other aerial vehicles (not shown), or a facility in any other location. The computer device 112 may fuse together the features of the images 10-1, 10-2' captured by the imaging device 150 at times $t_1$ and $t_2$, which are separated by a fraction of a second, and determine which points expressed in the image 10-1 correspond to points expressed in the rotated image 10-2'. Distances to points corresponding to such features may be determined according to stereo ranging algorithms or techniques and stored in one or more data stores or used for any purpose, including but not limited to navigation, guidance, surveillance or collision avoidance.

For example, as is shown in FIG. 1E, a depth map 15 of average or nominal ranges to regions corresponding to features below the aerial vehicle 110 that are expressed in both the image 10-1 and the rotated image 10-2', and tolerances associated with such ranges, may be generated and stored in one or more data stores. The depth map 15 of FIG. 1E includes ranges to a region 15-1 corresponding to a first automobile (e.g., approximately one hundred nineteen feet), a region 15-2 corresponding to a street on which the first automobile travels (e.g., approximately one hundred twenty-two and one half feet), a region 15-3 corresponding to a second automobile on the street (e.g., approximately one hundred eighteen feet) a region 15-4 corresponding to a dwelling (e.g., approximately one hundred one feet), a region 15-5 corresponding to a tree (e.g., approximately eighty-six feet), a region 15-6 corresponding to a pet (e.g., approximately one hundred twenty-two feet) and a region 15-7 generally corresponding to a ground area (e.g., approximately one hundred twenty-four feet) not occupied or covered by the dwelling, the tree or the pet. The depth map 15 may be used for any purpose, including but not limited to identifying a suitably large, flat and sturdy landing site that may accommodate one or more dimensions of the aerial vehicle 110.

Accordingly, the systems and methods of the present disclosure are directed to determining stereo distance information using imaging devices that are integrated into propeller blades on operating aerial vehicles. The propellers may include any number of blades (e.g., two blades, such as the propeller 140-4 of FIGS. 1A through 1D, as well as three, four or more blades) mounted about a hub that is configured to receive a mast or a shaft of a transmission associated with a motor, and to be rotated about the mast or shaft by the motor at a desired angular velocity for providing forces of lift or thrust to the aerial vehicle. Any number of the blades may include any number of imaging devices that are integrated therein, e.g., the single imaging device 150 embedded into the blade 144-4 of FIGS. 1A through 1D, or any number of other imaging devices.

In accordance with the present disclosure, imaging devices that are integrated into blades of operating propellers, and images captured by such imaging devices, may be used to determine stereo distance information according to any number of stereo ranging algorithms or techniques. Outputs from such algorithms or techniques may be generated or stored in any form, and used for any purpose. For example, in some embodiments, distances to objects or features in an environment determined according to stereo ranging algorithms or techniques may be aggregated into a depth map, such as the depth map 15 of FIG. 1E, that identifies or represents nominal or average distances to such objects or features and tolerances associated with such distances.

In some other embodiments, a point cloud or other three-dimensional representation of an environment may be generated and stored in one or more data files. The point cloud may represent positions of each of the points that appear in both of the images of a pair, with pixel-level resolution. The high-speed, reliably repetitive nature of a rotating propeller blade enables data to be captured regarding ranges to such points at high rates of speed, thereby enabling tolerances or confidence levels associated with such positions to be narrowed considerably after only a number of images are captured, over a brief period of time.

Imaging devices may be integrated into blades of a propeller in any manner, e.g., by embedding an imaging device into a blade, or by adhering an imaging device to a surface of a blade, in accordance with the present disclosure. Imaging devices that are integrated into such blades may have a field of view or axis of orientation that are aligned normal to the surfaces of such blades, or at any other angle or orientation. In some embodiments, the imaging devices may have adjustable fields of view or axes of orientation, e.g., by one or more actuated or motorized features for adjusting either a focal length or an angular orientation of the imaging device. Additionally, the imaging devices may be integrated into a blade of a propeller at any radius from a hub of the propeller. Similarly, an aerial vehicle having one or more imaging devices integrated into propellers may further include one or more additional imaging devices that integrated into portions of the aerial vehicle that are fixed in orientation, e.g., to a fuselage or other non-rotating portion of the aerial vehicle, and such imaging devices may be used in concert with integrated imaging devices in ranging applications.

Imaging data (e.g., visual imaging data) may be captured using one or more imaging devices such as digital cameras. Such devices may generally operate by capturing light that is reflected from objects, and by subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, e.g., digital images, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet.

A digital image is a collection of pixels, typically arranged in an array, which defines an optically formed reproduction of one or more objects, backgrounds or other features of a scene and may be stored in a data file. In a visual image, each of the pixels represents or identifies a color or other light condition associated with a portion of such objects, backgrounds or features. For example, a black-and-white visual image includes a single bit for representing a light condition of the pixel in a binary fashion (e.g., either black or white), while a grayscale visual image may represent the light condition in multiple bits (e.g., two to eight bits for defining tones of gray in terms of percentages or shares of black-and-white), and a color visual image may include groups of bits corresponding to each of a plurality of base colors (e.g., red, green or blue), and the groups of bits may collectively represent a color associated with the pixel. A depth image is also a collection of pixels that defines an optically formed reproduction of one or more objects, backgrounds or other features of a scene, and may also be stored in a data file. Unlike the pixels of a visual image, however, each of the pixels of a depth image represents or identifies not a light condition or color of such objects, backgrounds or features, but a distance to objects, backgrounds or features. For example, a pixel of a depth image may represent a distance between a sensor of an imaging device that captured the depth image (e.g., a depth camera or range sensor) and the respective object, background or feature to which the pixel corresponds.

Imaging data files that are stored in one or more data stores may be printed onto paper, presented on one or more computer displays, or subjected to one or more analyses, such as to identify items expressed therein. Such data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), Quick-Time (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle), by causing a change in a distance between the sensor and the lens (e.g., optical zoom lenses or digital zoom lenses), a change in a location of the imaging device, or a change in one or more of the angles defining an angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color candy apple red is expressed as #31314A. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

As is discussed above, the systems and methods of the present disclosure are directed to determining stereo distance information using imaging devices that are integrated into propeller blades on operating aerial vehicles. The images captured by such imaging devices may be processed according to one or more stereo ranging algorithms or techniques. Although determining depth information from a dynamic environment using by such algorithms or techniques typically requires the use of at least two imaging devices that are separated by a baseline distance, and the capture of imaging data from such imaging devices substantially simultaneously, the systems and methods of the present disclosure may, in some embodiments, use imaging data captured a single imaging device embedded in a propeller blade for stereo ranging. The imaging device may capture imaging data with the propeller blade at different orientations, thereby relying on the typically high rotational speed of an aerial vehicle's propeller to effectively position the imaging device in two places at once.

For example, an imaging device that may capture images at frame rates on the order of hundreds of frames per second (fps), and is embedded into a surface of a propeller blade that is rotating at angular velocities on the order of thousands of revolutions per minute (rpm), may capture clear images with the propeller at different orientations and process such images to make depth determinations regarding any objects that are expressed in both of the images. In particular, where an imaging device may be configured to capture images with the propeller at orientations that are approximately one hundred eighty degrees, or 180°, apart or opposed from one another, a baseline distance or separation (e.g., twice the radius of the imaging device from a hub of the propeller), a disparity (e.g., a distance between a common point in each of the images), a focal length of the imaging device and the contents of the respective images may be processed in order to determine ranges to each of the objects expressed in the two images, and to define a depth map, a depth model, or another depth image of an environment accordingly.

Distances (or depths or ranges) to objects that are represented in a pair of stereo images captured by imaging devices (e.g., digital cameras) having fields of view that overlap, at least partially. For each point of each object that appears in both of the images, lines extending from the respective lenses, lens modules or other sensors of the respective imaging devices through representations of the points of the objects in each of the images will virtually intersect at a location corresponding to the actual position of that point, in three-dimensional space. Through the use of traditional geometric principles and properties, e.g., the properties of similar triangles, as well as the known or knowable variables such as baseline distance or separation between the imaging devices, the disparity between the points within the respective images and the focal lengths of the respective imaging devices, coordinates of the intersecting point may be determined accordingly.

Because a propeller of an aerial vehicle typically rotates at angular velocities of several thousand revolutions per minute, embedding a single imaging device into a propeller blade, e.g., into a surface of a propeller, enables stereo images to be captured with by a single imaging device at known positions and at given times. In order to determine stereo distance information from a pair of images, each surface point that is visible within a first one of the images must be identified in the second one of the images, and the geometric position of the imaging device as each of the images was captured must be known. Representations of a common point within two stereo images are sometimes called epipoles, or a conjugate pair of such epipoles, and the disparity is defined as the distance between the conjugate pair of epipoles when the two images are superimposed.

Where a point in space appears in two images, e.g., as epipoles, a plane defined by the positions of the respective epipoles within the images and an actual position of the point in space is called an epipolar plane. The images may then be co-aligned based on their contents, e.g., along lines corresponding to intersections of the epipolar plane with the respective image planes, or their respective epipolar lines. After the images have been aligned based on their contents, an actual position of the object may be determined by triangulating lines extending from lenses, lens modules or other sensors of an imaging device through the representations of the points in the respective images within the imaging plane. An intersection of such lines corresponds to the actual position of the point, and a distance to the point may be determined accordingly based on this actual position. Stereo ranging algorithms and techniques may be used to determine ranges or distances to each of the points that appears in both of the images, and such ranges or distances may be used to define a point cloud, a depth map or another three-dimensional model of the environment in which the object is provided. The depth model may be stored in a data file (e.g., a depth image) or utilized for any purpose, including but not limited to navigation, guidance, surveillance or collision avoidance.

Stereo ranging algorithms and techniques thus require determining correspondences of the epipoles in each of the pair of images, with each of the epipoles corresponding to a common point in three-dimensional space. When a plurality of correspondences of epipoles are identified from each of a pair of images of a scene, disparities for each of the conjugate pairs of epipoles may be determined, and a map of such disparities that mimics a three-dimensional structure of the scene may be reconstructed accordingly if information regarding aspects of the scene, e.g., geometric parameters such as the baseline distance or separation, the focal lengths of the imaging devices and others, is known.

There are a number of computer-based stereo ranging algorithms and techniques for determining real-world positions of points expressed in pairs of images of scenes, and for generating depth maps, point clouds or other three-dimensional representations of such scenes based on such positions. Such algorithms or techniques may aid in the performance of calibration, correspondence and/or reconstruction functions. For example, the Open Source Computer Vision (or "OpenCV") library includes a number of computer-based algorithms or other programming functions that are directed to determining distances or ranges from pairs of images. Similarly, a number of other stereo ranging algorithms or techniques programmed in the MATLAB language are publicly available. Computer-based algorithms or techniques are available from a number of other sources, as well.

Imaging devices may be integrated into propellers that are aligned horizontally or vertically, e.g., in forward or aft orientations, or in upward or downward orientations, or at any other orientations or angles, which may be relative or absolute. In some embodiments, two or more digital cameras may be integrated into a propeller, either in the same blade, or in different blades. The digital cameras may be homogenous (e.g., functionally equivalent or having the same capacities) or, alternatively, heterogeneous (e.g., having different capacities), and stereo images captured by such cameras for determining depths may be processed in multiple calculations. In some embodiments, an aerial vehicle may include one or more imaging devices that are integrated into blades of a rotating propeller and also mounted to non-rotating features of the aerial vehicle. Images captured by each of the imaging devices may be used for stereo ranging purposes, e.g., by determining baseline distances or separations between such imaging devices, disparities of objects within such images, and focal lengths of the respective imaging devices.

Figure 2:
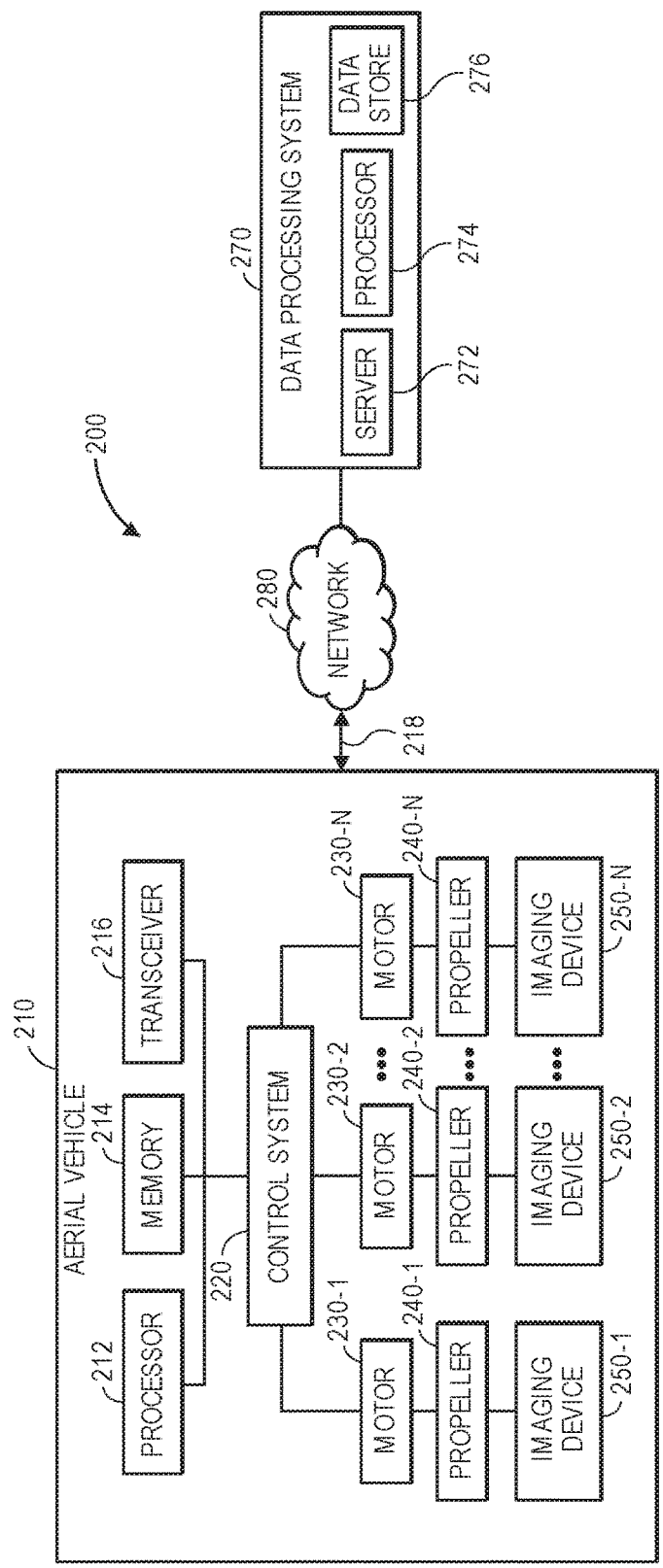
FIG. 2 is a block diagram of one system for determining stereo distance information using imaging devices integrated into propeller blades in accordance with embodiments of the present disclosure.

Referring to FIG. 2, a block diagram of one system 200 for determining stereo distance information using imaging devices integrated into propeller blades in accordance with embodiments of the present disclosure is shown. The system 200 of FIG. 2 includes an aerial vehicle 210 and a data processing system 270 connected to one another over a network 280, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1E.

The aerial vehicle 210 includes a processor 212, a memory 214 and a transceiver 216. The aerial vehicle 210 further includes a control system 220, a plurality of propulsion motors 230-1, 230-2 . . . 230-$n$, a plurality of propellers 240-1, 240-2 . . . 240-$n$ and a plurality of imaging devices 250-1, 250-2 . . . 250-$n$.

The processor 212 may be configured to perform any type or form of computing function, including but not limited to the execution of one or more machine learning algorithms or techniques. For example, the processor 212 may control any aspects of the operation of the aerial vehicle 210 and the one or more computer-based components thereon, including but not limited to the propulsion motors 230-1, 230-2 . . . 230-$n$, the propellers 240-1, 240-2 . . . 240-$n$ and the imaging devices 250-1, 250-2 . . . 250-$n$. For example, the processor 212 may control the operation of one or more control systems or modules, such as the control system 220, for generating instructions for conducting operations of one or more of the propulsion motors 230-1, 230-2 . . . 230-$n$, the propellers 240-1, 240-2 . . . 240-$n$ and the imaging devices 250-1, 250-2 . . . 250-$n$. Such control systems or modules may be associated with one or more other computing devices or machines, and may communicate with the data processing system 270 or one or more other computer devices (not shown) over the network 280, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor implementing any of a number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, flight paths, flight control parameters and/or other data items accessible by or to the processor 212. The memory 214 may be implemented using any suitable memory technology, such as static random access memory (SRAM), synchronous dynamic RAM (SDRAM), nonvolatile/Flash-type memory, or any other type of memory. In some embodiments, program instructions, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "WiFi") protocol, such as over the network 280 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 280. For example, in some embodiments, the transceiver 216 may be configured to coordinate I/O traffic between the processor 212 and one or more onboard or external computer devices or components. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling the operation of the aerial vehicle 210 and for engaging with or releasing items, as desired. For example, the control system 220 may be configured to cause or control the operation of one or more of the propulsion motors 230-1, 230-2 . . . 230-$n$, the propellers 240-1, 240-2 . . . 240-$n$ and the imaging devices 250-1, 250-2 . . . 250-$n$, such as to cause one or more of the propulsion motors 230-1, 230-2 . . . 230-$n$ to rotate the propellers 240-1, 240-2 . . . 240-$n$ at a desired speed, in order to guide the aerial vehicle 210 along a determined or desired flight path, and to cause one or more of the imaging devices 250-1, 250-2 . . . 250-$n$ to capture any imaging data (e.g., still or moving images) as well as any associated audio data and/or metadata. The control system 220 may further control other aspects of the aerial vehicle 210, including but not limited to the operation of one or more control surfaces (not shown) such as wings, rudders, ailerons, elevators, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216.

The propulsion motors 230-1, 230-2 . . . 230-$n$ may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. For example, one or more of the propulsion motors 230-1, 230-2 . . . 230-$n$ may be a brushless direct current (DC) motor such as an outrunner brushless motor or an inrunner brushless motor.

The aerial vehicle 210 may include any number of such propulsion motors 230-1, 230-2 . . . 230-$n$ of any kind. For example, one or more of the propulsion motors 230-1, 230-2 . . . 230-$n$ may be aligned or configured to provide forces of lift to the aerial vehicle 210, exclusively, while one or more of the propulsion motors 230-1, 230-2 . . . 230-$n$ may be aligned or configured to provide forces of thrust to the aerial vehicle 210, exclusively. Alternatively, one or more of the propulsion motors 230-1, 230-2 . . . 230-$n$ may be aligned or configured to provide forces of lift and forces of thrust to the aerial vehicle 210, as needed. For example, the propulsion motors 230-1, 230-2 . . . 230-$n$ may be fixed in their orientation on the aerial vehicle 210, or configured to vary their respective orientations, e.g., a tilt-rotor aircraft. Moreover, the propulsion motors 230-1, 230-2 . . . 230-$n$ may be aligned or configured to operate with different capacities or ratings, or at different speeds, or coupled to propellers having different sizes and shapes.

The propellers 240-1, 240-2 . . . 240-$n$ may be any rotors or rotatable systems having a plurality of shaped blades joined to a hub or boss. Each of the propellers 240-1, 240-2 . . . 240-$n$ is rotatably mounted to a mast or shaft associated with a respective one of the propulsion motors 230-1, 230-2 . . . 230-$n$ and configured to generate forces of thrust when rotated within a fluid. Each of the propellers 240-1, 240-2 . . . 240-$n$ may include any number of blades, and may be fixed pitch, adjustable pitch or variable pitch in nature. Moreover, one or more of the propellers 240-1, 240-2 . . . 240-$n$ may be banded or shielded in any manner. In some embodiments, one or more of the propellers 240-1, 240-2 . . . 240-$n$ may be configured to rotate about a vertical axis, and to provide forces of thrust in a vertical direction (e.g., upward) accordingly. In some other embodiments, one or more of the propellers 240-1, 240-2 . . . 240-$n$ may be configured to rotate about a horizontal axis, and to provide forces of thrust in a horizontal direction (e.g., forward) accordingly. In still other embodiments, one or more of the propellers 240-1, 240-2 . . . 240-$n$ may be configured to rotate about axes that are neither horizontal nor vertical, and to provide forces of thrust in directions corresponding to such axes accordingly.

The imaging devices 250-1, 250-2 . . . 250-*n* may be any form of optical recording devices that are embedded into surfaces of the respective propellers 240-1, 240-2 . . . 240-*n* and may be used to photograph or otherwise record imaging data of structures, facilities, terrain or any other elements encountered during operation of the aerial vehicle 210, or for any other purpose. The imaging devices 250-1, 250-2 . . . 250-*n* may include one or more sensors, memory or storage components and processors, and such sensors, memory components or processors may further include one or more photosensitive surfaces, filters, chips, electrodes, clocks, boards, timers or any other relevant features (not shown). Such imaging devices 250-1, 250-2 . . . 250-*n* may capture imaging data in the form of one or more still or moving images of any kind or form, as well as any relevant audio signals or other information during the operation of the aerial vehicle 210, including but not limited to when one or more of the propellers 240-1, 240-2 . . . 240-*n* into which such imaging devices 250-1, 250-2 . . . 250-*n* are integrated is rotating at operational speeds.

The imaging devices 250-1, 250-2 . . . 250-*n* may communicate with the processor 212 and/or the control system 220, or with one another, by way of a wired or wireless connection that may be dedicated or comprise all or part of an internal network (not shown). Additionally, the imaging devices 250-1, 250-2 . . . 250-*n* may be adapted or otherwise configured to communicate with the data processing system 270 by way of the network 280. Although each of the propellers 240-1, 240-2 . . . 240-*n* of FIG. 2 includes a single box corresponding to one of the imaging devices 250-1, 250-2 . . . 250-*n*, those of ordinary skill in the pertinent arts will recognize that any number or type of imaging devices may be provided in any number of the blades of the propellers 240-1, 240-2 . . . 240-*n* in accordance with the present disclosure, including but not limited to digital cameras, depth sensors or range cameras, infrared cameras, radiographic cameras or other optical sensors.

In addition to the imaging devices 250-1, 250-2 . . . 250-*n*, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more Global Positioning System ("GPS") receivers or sensors, compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

The data processing system 270 includes one or more physical computer servers 272 having one or more computer processors 274 and any number of data stores 276 (e.g., databases) associated therewith, as well as provided for any specific or general purpose. For example, the data processing system 270 of FIG. 2 may be independently provided for the exclusive purpose of receiving, analyzing or storing imaging data or other information or data received from the aerial vehicle 210 or, alternatively, provided in connection with one or more physical or virtual services configured to receive, analyze or store such imaging data or other information or data, as well as one or more other functions. The servers 272 may be connected to or otherwise communicate with the processors 274 and the data stores 276, which may store any type of information or data, including but not limited to acoustic signals, information or data relating to imaging data, or information or data regarding environmental conditions, operational characteristics, or positions, for any purpose. The servers 272 and/or the computer processors 274 may also connect to or otherwise communicate with the network 280, as indicated by line 278, through the sending and receiving of digital data. For example, the data processing system 270 may include any facilities, stations or locations having the ability or capacity to receive and store information or data, such as media files, in one or more data stores, e.g., media files received from the aerial vehicle 210, or from one another, or from one or more other external computer systems (not shown) via the network 280. In some embodiments, the data processing system 270 may be provided in a physical location. In other such embodiments, the data processing system 270 may be provided in one or more alternate or virtual locations, e.g., in a "cloud"-based environment. In still other embodiments, the data processing system 270 may be provided onboard one or more aerial vehicles, including but not limited to the aerial vehicle 210.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 and/or the data processing system 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the aerial vehicle 210 may be adapted to transmit information or data in the form of synchronous or asynchronous messages to the data processing system 270 or to any other computer device (e.g., to one or more other aerial vehicles) in real time or in near-real time, or in one or more offline processes, via the network 280. Those of ordinary skill in the pertinent art would recognize that the aerial vehicle 210 or the data processing system 270 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212 or the processor 274, or any other computers or control systems utilized by the aerial vehicle 210 or the data processing system 270 (e.g., by one or more other aerial vehicles), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
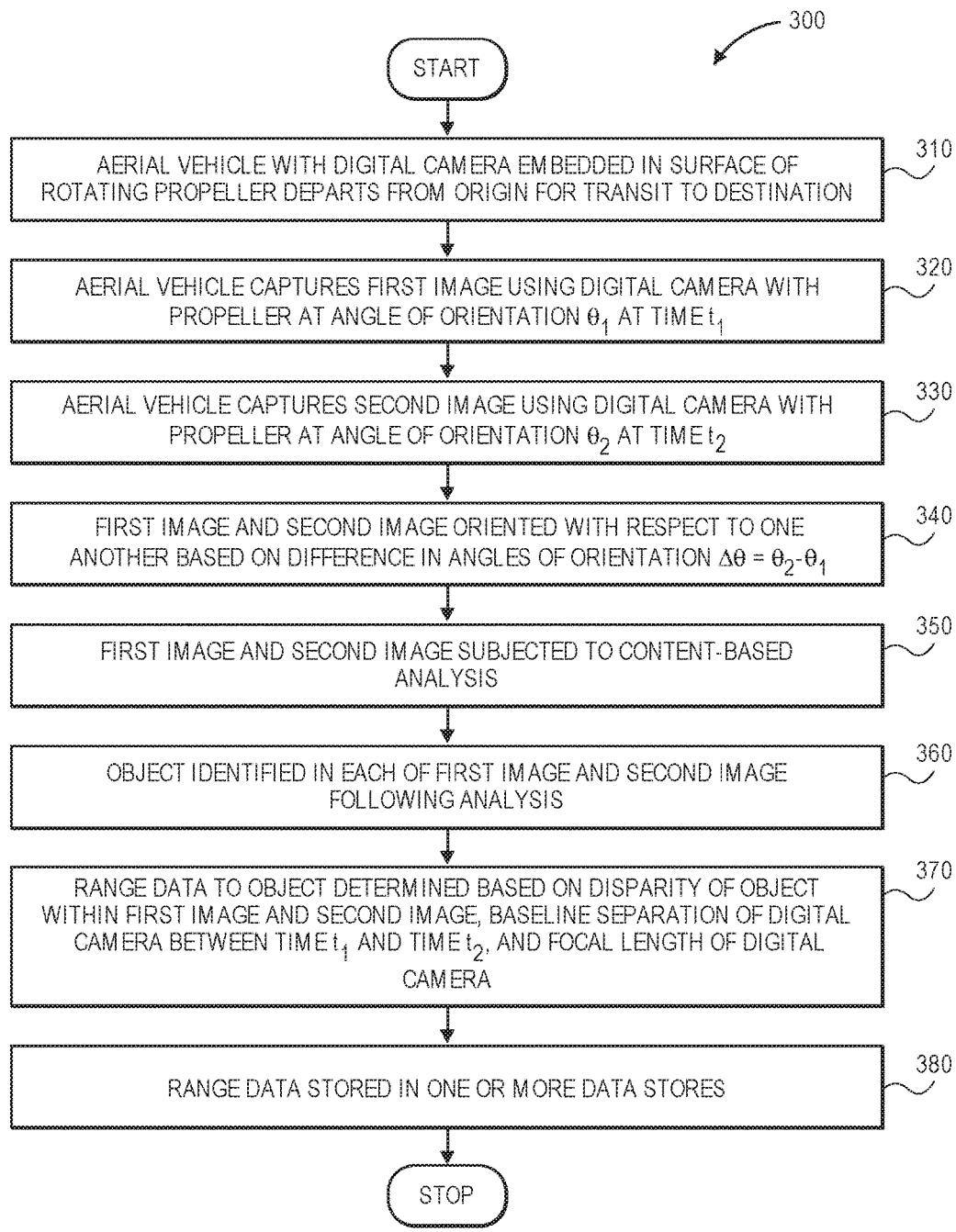
FIG. 3 is a flow chart of one process for determining stereo distance information using imaging devices integrated into propeller blades in accordance with embodiments of the present disclosure.

As is discussed above, an aerial vehicle may include an imaging device that is embedded or otherwise integrated within one or more blades of a rotating propeller of an aerial vehicle. Images captured by the imaging device may be processed by stereo ranging algorithms or techniques to determine ranges to any objects that are expressed in each of the images. Referring to FIG. 3, a flow chart 300 of one process for determining stereo distance information using imaging devices integrated into propeller blades in accordance with embodiments of the present disclosure is shown.

At box 310, an aerial vehicle having a digital camera embedded into a surface of a rotating propeller departs from an origin for transit to a destination. The aerial vehicle may be programmed to perform any mission, e.g., the delivery of a payload from the origin to the destination, and the rotating propeller into which the digital camera is embedded may be provided for generating forces of thrust, forces of lift, or forces of thrust and lift.

At box 320, the aerial vehicle captures a first image using the digital camera with the propeller at an angle of orientation $\theta_1$ at time $t_1$. The digital camera may be programmed to begin capturing one or more images automatically, upon an arrival of the aerial vehicle at a given location, upon the aerial vehicle reaching a given speed or a given altitude, upon sensing one or more objects (e.g., collision risks) nearby, upon detecting any predetermined environmental or operating condition, or for any other reason. At box 330, the aerial vehicle captures a second image using the digital camera with the propeller at an angle of orientation $\theta_2$ at time $t_2$. The digital camera may be programmed to capture another image based on an angular orientation or position of the propeller, at a predetermined time, or for any other reason. For example, in some embodiments, the digital camera may be configured to capture the second image when the angle of orientation of the propeller is one hundred eighty degrees (180°) greater or less than the angle of orientation of the propeller when the first image was captured. As yet another example, in some embodiments, the digital camera may be configured to capture the second image after a predetermined elapsed time following the capture of the first image.

At box 340, the first image and the second image are oriented with respect to one another based on the difference $\Delta\theta$ in the angles of orientation $\theta_2$ and $\theta_1$, or $\theta_2-\theta_1$. For example, the first image may be reoriented with respect to the second image, or the second image may be reoriented with respect to the first image. Alternatively, each of the first image and the second image may be independently oriented with respect to a common standard angle.

At box 350, the first image and the second image are subjected to a content-based analysis. For example, each of the first image and the second image may be evaluated to identify attributes of any points represented in either or both of the first image and the second image, including but not limited to any number of edges, contours, outlines, colors, textures, silhouettes, shapes or other characteristics of objects, or portions of objects, expressed therein using one or more algorithms or machine-learning tools. Some such algorithms or tools may include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

At box 360, an object is identified in each of the first image and the second image. For example, an object may be identified in one of the images, and a search may be conducted for the object in another of the images. In some embodiments, the epipolar lines of the respective images may be rectified using one or more transformations, in order to align the epipolar lines with scan lines of the images, thereby facilitating a search for an object that was identified in one of the images in the other of the images. Thereafter, pixels corresponding to points of the object in one image may be identified in the other of the images, e.g., by matching pixels between the respective images, until the object is identified.

At box 370, range data to the object is determined based on a disparity of the object within the first image and the second image, a baseline separation of the digital camera at time $t_1$ and time $t_2$, and a focal length of the digital camera according to one or more stereo algorithms and/or techniques. As is noted above, the disparity is defined as the separation of a given point between two images of the same scene, while the baseline separation is a distance between positions of the digital camera when the first image was captured (e.g., at time $t_1$) and a second position of the digital camera when the second image was captured (e.g., at time $t_2$), and the focal length of the digital camera is a distance between a sensor and a lens within the digital camera. Stereo ranging algorithms or techniques may use the disparity, the baseline separation and the focal length in order to determine a range or a distance to the object, or ranges or distances to one or more aspects of the object. At box 380, the range data is stored in one or more data stores, and the process ends. The range data may be utilized for any purpose, e.g., for navigation, guidance, surveillance, collision avoidance, or any other purpose.

Figure 4A:
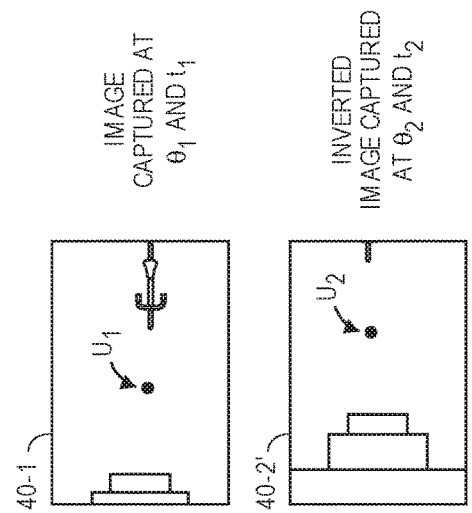
FIGS. 4A, 4B and 4C are views of aspects of one system for determining stereo distance information using imaging devices integrated into a propeller blade in accordance with embodiments of the present disclosure.
Figure 4A:
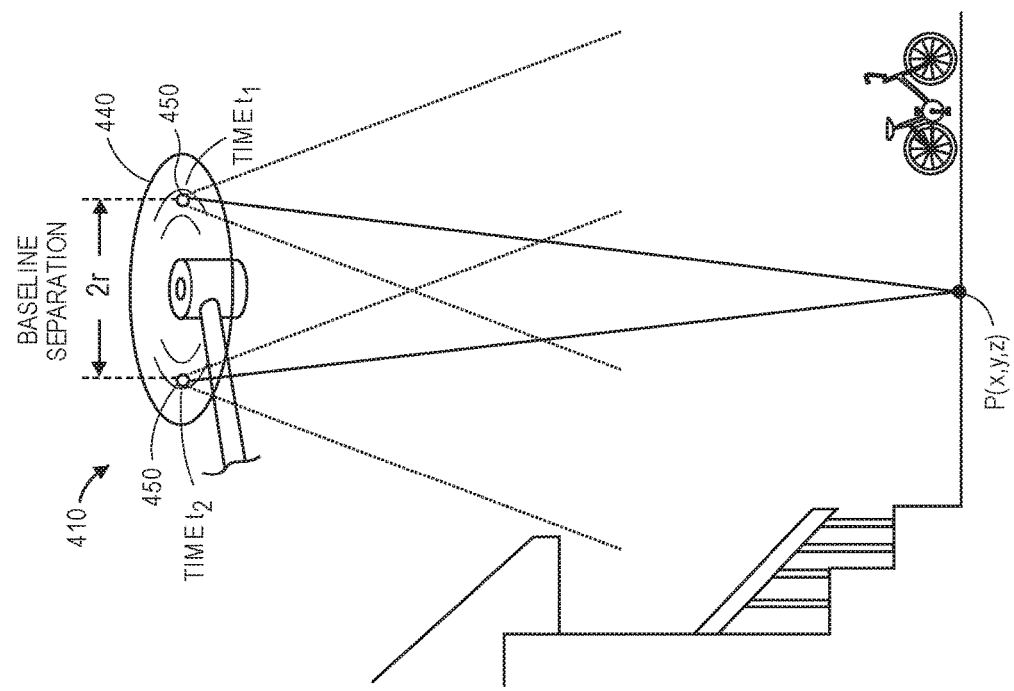
Figure 4B:
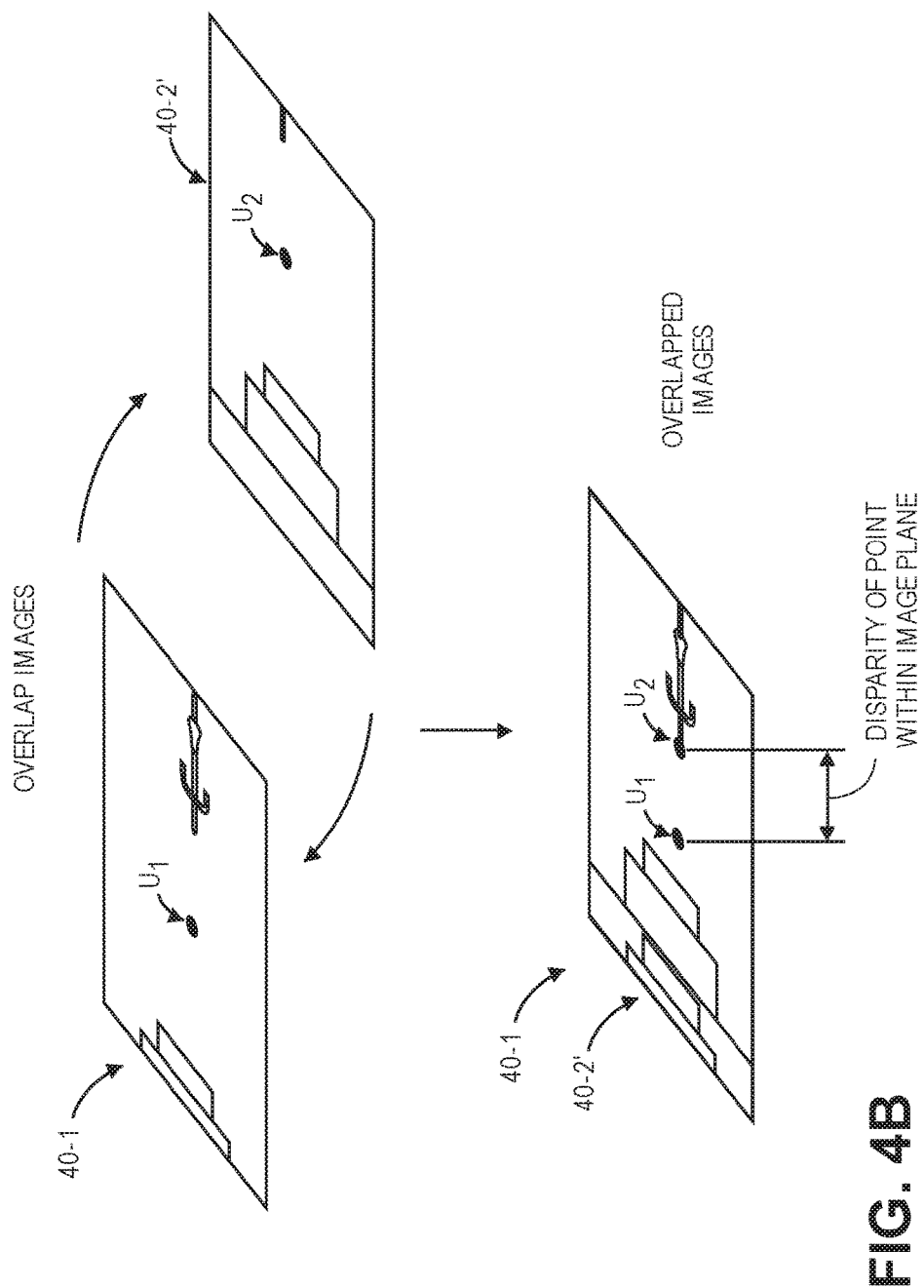
Figure 4C:
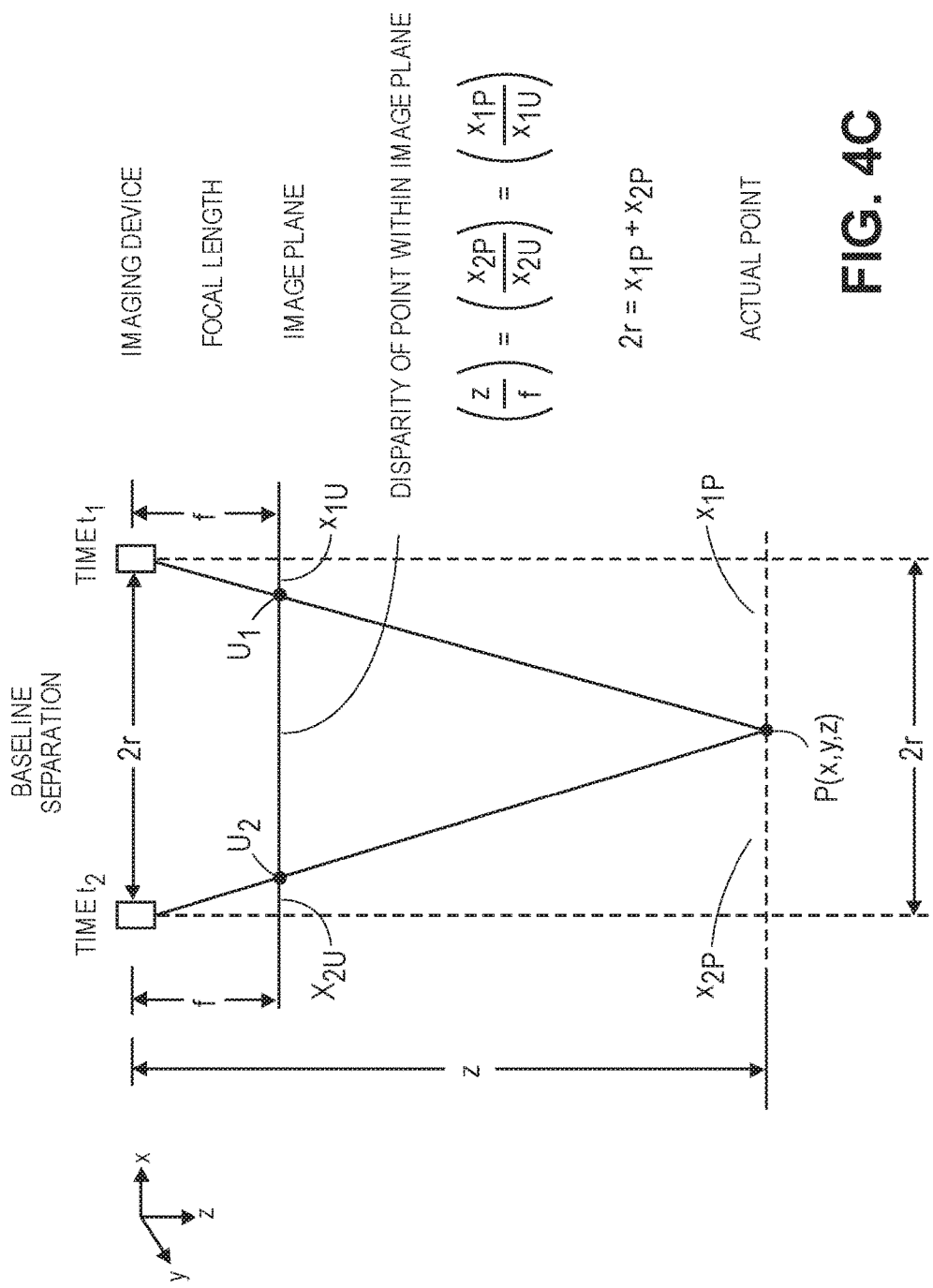

Referring to FIGS. 4A, 4B and 4C, views of aspects of one system 400 for determining stereo distance information using imaging devices integrated into a propeller blade in accordance with embodiments of the present disclosure are shown. Except where otherwise noted, reference numerals preceded by the number "4" shown in FIG. 4A, FIG. 4B or FIG. 4C indicate components or features that are similar to components or features having reference numerals preceded by the number "2" shown in FIG. 2 or by the number "1" shown in FIGS. 1A through 1E.

As is shown in FIG. 4A, an aerial vehicle 410 having a propeller 440 with an imaging device 450 embedded in an underside thereof is shown. The aerial vehicle 410 is shown as approaching a point P(x,y,z) in space within a scene having one or more structures, obstacles and/or other objects (e.g., a home and a bicycle). The point P(x,y,z) is within a field of view of the imaging device 450 at times $t_1$ and $t_2$, when the propeller 440 is aligned at angles $\theta_1$ and $\theta_2$. As is also shown in FIG. 4A, an image 40-1 captured at time $t_1$, and with the propeller 440 aligned at the angle $\theta_1$ includes a projection $U_1$ of the point P(x,y,z). An inverted image 40-2' captured at time $t_2$ and with the propeller 440 aligned at the angle $\theta_2$ includes a projection $U_2$ of the point P(x,y,z). Where the angle $\theta_2$ and the angle $\theta_2$ are one hundred eighty degrees (180°) apart, the inverted image 40-2' may be derived by rotating an image captured at time $t_2$ by one hundred eighty degrees (180°). The baseline separation of the position of the imaging device 450 at time $t_1$ and the position of the imaging device 450 at time $t_2$ is approximately 2r, or twice the radius r of the distance from a hub of the propeller 440 to the imaging device 450.

A range or distance to the point P(x,y,z) in space, or to one or more other points expressed within both the image 40-1 and the inverted image 40-2', may be determined by virtually overlapping the images 40-1, 40-2' and determining disparities between projections of each point that is shown in both of the image 40-1, 40-2'. As is shown in FIG. 4B, where the image 40-1 and the inverted image 40-2' are overlapped upon one another, a disparity between the projections $U_1$, $U_2$ of the point P(x,y,z) in space within the images 40-1, 40-2' is apparent.

As is shown in FIG. 4C, the range z to the point P(x,y,z) may be determined by stereo ranging using the known baseline separation 2r, the focal length f, the projections $U_2$ of the point P(x,y,z) within the image 40-1 and the rotated image 40-2'. Stereo ranging algorithms and techniques may automatically determine the position of the point P(x,y,z) and, therefore, the range z to the point P(x,y,z), by triangulating the positions of the imaging device 450 at time $t_1$ and time $t_2$, the projections $U_1$, $U_2$ using the focal length f and the baseline separation 2r.

Although FIGS. 4A, 4B and 4C depict the determination of a position of and/or range to a single point P(x,y,z) in space, the systems and methods of the present disclosure are not so limited, and may be used to determine positions of and/or ranges to each of the points that appears in both of the images 40-1, 40-2', according to the same stereo ranging algorithms or techniques, or to one or more other algorithms or techniques. Using such positions or ranges, any form of three-dimensional representation of the scene and/or the structures, objects or other features may be constructed, including but not limited to a point cloud representing pixel-level positions of each of the points appearing in both of the images 40-1, 40-2', or a depth map, e.g., the depth map 15 of FIG. 1E, that shows average or nominal ranges to one or more of the objects within the scene, along with one or more tolerances or confidence levels representative of the accuracy or precision of such ranges. Because the propeller 440 of the aerial vehicle 410 of FIG. 4A typically rotates at angular velocities of several thousand revolutions per minute, the imaging device 450 effectively appears in two places simultaneously (e.g., within small fractions of seconds). Images captured by the single imaging device 450 may, therefore, be utilized in determining ranges from the propeller 440 to one or more objects expressed in two or more of such images.

As is noted above, images captured by an imaging device integrated into a propeller surface may be oriented with respect to each other on any basis, such as by reorienting one image with respect to another image, or by reorienting each of the images with respect to a common standard. Referring to FIGS. 5A through 5C, views of aspects of one system for determining stereo distance information using imaging devices integrated into propeller blades in accordance with embodiments of the present disclosure are shown. Except where otherwise noted, reference numerals preceded by the number "5" shown in FIG. 5A, FIG. 5B or FIG. 5C indicate components or features that are similar to components or features having reference numerals preceded by the number "4" shown in FIG. 4A, FIG. 4B or FIG. 4C, by the number "2" shown in FIG. 2 or by the number "1" shown in FIGS. 1A through 1E.

Referring to FIG. 5A, two images 50A-1, 50A-2 captured by an imaging device embedded in a propeller are shown. The image 50A-1 was captured with the propeller at an angle $\theta_1$ of zero degrees (0°), while the image 50A-2 was captured with the propeller at an angle $\theta_2$ that is greater than zero degrees. Therefore, in order to properly orient the images 50A-1, 50A-2 with respect to one another, the image 50A-2 may be rotated by the angle $\theta_2$ in an opposite direction to form an image 50A-2', thereby ensuring that the images 50A-1, 50A-2' are properly aligned with respect to one another, and canceling out the effects of the propeller's orientation on the respective images 50A-1, 50A-2. With the images 50A-1, 50A-2' properly aligned with respect to one another, points corresponding to objects that appear in each of the images 50A-1, 50A-2' may be identified, and distances (or ranges) to such objects may be determined, e.g., by stereo ranging algorithms or techniques.

Conversely, referring to FIG. 5B, two images 50B-1, 50B-2 captured by an imaging device embedded in a propeller are shown. The image 50B-1 was captured with the propeller at an angle $\theta_1$ that is less than zero degrees (0°), while the image 50B-2 was captured with the propeller at an angle $\theta_2$ that is equal to zero degrees. Therefore, in order to properly orient the images 50B-1, 50B-2 with respect to one another, the image 50B-1 may be rotated by the angle $\theta_1$ in an opposite direction to form an image 50B-1', thereby ensuring that the images 50B-1', 50B-2 are properly aligned with respect to one another, and canceling out the effects of the propeller's orientation on the respective images 50B-1, 50B-2.

Images may also be reoriented with respect to standard angle of orientation, rather than an angle of orientation of either of the images. Referring to FIG. 5C, two images 50C-1, 50C-2 captured by an imaging device embedded in a propeller are shown. The image 50C-1 was captured with the propeller at an angle $\theta_1$ that is greater than zero degrees (0°), while the image 50C-2 was captured with the propeller at an angle $\theta_2$ that is less than zero degrees. Therefore, in order to properly orient the images 50C-1, 50C-2 with respect to one another, at a standard angle of orientation $\theta_{STD}$, the image 50C-1 may be rotated by an angle $(\theta_1-\theta_{STD})$ in an opposite direction to form an image 50C-1', and the image 50C-2 may be rotated by an angle $(\theta_{STD}-\theta_2)$ in an opposite direction to form an image 50C-2', thereby ensuring that the images 50C-1', 50C-2 are properly aligned with respect to one another, at the standard angle of orientation $\theta_{STD}$, and canceling out the effects of the propeller's orientation on the respective images 50C-1, 50C-2.

Figure 6:
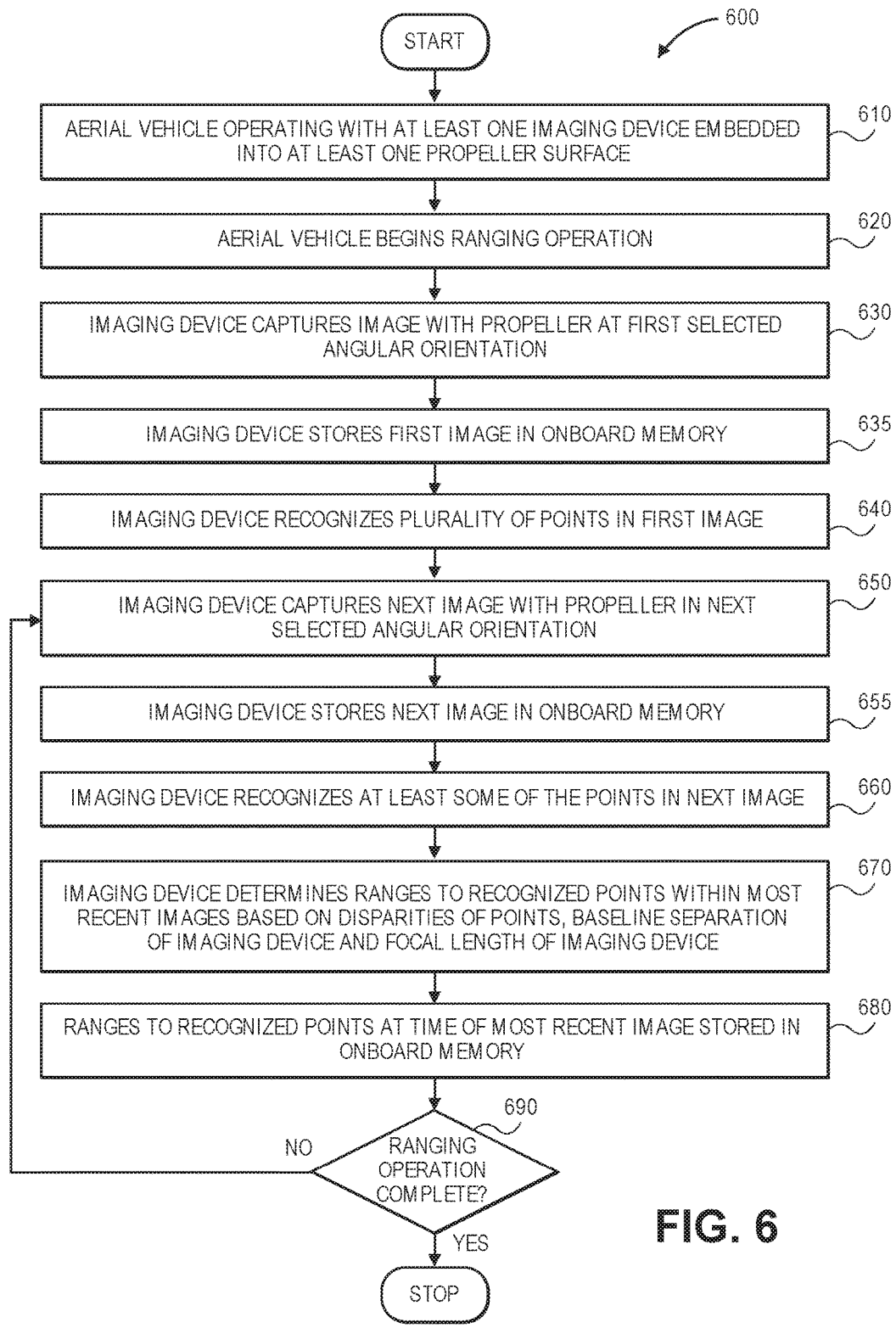
FIG. 6 is a flow chart of one process for determining stereo distance information using imaging devices integrated into propeller blades in accordance with embodiments of the present disclosure.

As is discussed above, the systems and methods of the present disclosure may be used to determine positions of any number of points (or ranges or distances to such points) appearing in two or more images of a scene that are captured by an imaging device integrated into a blade of a rotating propeller of an aerial vehicle, or by any number of other imaging devices provided on the aerial vehicle. Using such positions (or ranges or distances thereto), a three-dimensional representation of a scene may be constructed, including a point cloud, a depth map, or any other virtual structure representing the geographic or topographical layout of the scene. Referring to FIG. 6, a flow chart 600 of one process for determining stereo distance information using imaging devices integrated into propeller blades in accordance with embodiments of the present disclosure is shown. At box 610, an aerial vehicle operates with at least one imaging device embedded into at least one propeller surface. The aerial vehicle may include a single imaging device embedded into a single blade of one propeller, such as the imaging device 150 embedded into the first blade 144-4 of the propeller 140-4 of FIGS. 1A through 1D, or multiple imaging devices that are embedded into surfaces of multiple blades of multiple propellers.

At box 620, the aerial vehicle begins a ranging operation, in which the aerial vehicle is configured to determine ranges or distances to any number of points (e.g., points corresponding to surfaces of structures or objects) that are present below the aerial vehicle, such as when searching for a suitable location for the aerial vehicle to land for any reason. Alternatively, the aerial vehicle may conduct ranging operations to determine ranges or distances to points that are above, forward of, behind, to the left of or to the right of the aerial vehicle, or in any other direction with respect to the aerial vehicle, and appearing in two or more images captured by an imaging device integrated into an operating propeller.

At box 630, the imaging device captures an image with the propeller blade at a first selected angular orientation. The blade may be aligned at any angle with respect to the aerial vehicle, e.g., transverse to a direction of travel, along the direction of travel, or in any other orientation. At box 635, the imaging device stores the first image in an onboard memory, e.g., in one or more databases, data stores or other components provided aboard the aerial vehicle. Alternatively, in some embodiments, the aerial vehicle may transmit the first image to a ground-based or "cloud"-based processing facility, or to one or more of such facilities, using one or more transceivers. The first image may be transmitted to one or more of such facilities in a synchronous or an asynchronous process, e.g., in real time or in near-real time, and either singly or as part of a batch process. Alternatively, the first image, and any number of other images, may be transmitted to another facility upon a completion of a mission, e.g., for a forensic analysis of any surface features expressed in images captured by the imaging device.

At box 640, the imaging device recognizes a plurality of points within the first image. For example, such points may correspond to one or more edges, contours, outlines, colors, textures, silhouettes, shapes or other characteristics of objects shown in the first image, or portions of such objects, that may be identified therein using one or more algorithms or machine-learning tools. Alternatively, the points may be recognized by computer devices provided at a ground-based or "cloud"-based processing facility, or at one or more of such facilities, e.g., in real time, in near-real time, or at any later time.

At box 650, the imaging device captures a next image with the propeller blade in a next selected angular orientation. For example, the imaging device may be configured to capture the next image at a predetermined time, or when the propeller blade reaches a predetermined orientation. In some embodiments, the predetermined time or the predetermined orientation may be selected based on an operating speed (e.g., an angular velocity) of the propeller or of a motor to which the propeller is rotatably coupled. At box 655, the imaging device stores the next image in an onboard memory, and at box 660, the imaging device recognizes at least some of the plurality of points that were previously recognized in the next image. Alternatively, as is discussed above, the imaging device may transmit the next image to a ground-based or "cloud"-based processing facility, or to one or more of such facilities, for storage or processing, e.g., in real time, in near-real time, or at any later time.

At box 670, the imaging device determines ranges to the recognized points based on disparities of such points within the most recent images, baseline separations of the imaging device when each of the most recent images was captured and/or a focal length of the imaging device when the most recent images were captured. For example, as is discussed above, the images may be realigned with respect to one another (e.g., with respect to the contents thereof), and projections of the points that are recognized within each of the two most recent images may be identified therein. Disparities between such projections may then be determined, and using the disparities, the baseline separation and a focal length of the imaging device, ranges to the recognized points may be determined according to one or more stereo ranging algorithms or techniques. At box 680, ranges to the recognized points at the time of the most recent image are stored in the onboard memory or, alternatively, on one or more ground-based or "cloud"-based facilities, and may be used for any purpose. For example, the ranges may be used to define a point cloud or depth map of a given region, and the point cloud or depth map may be utilized to identify a specific location for the aerial vehicle to land, or for any other reason for which the ranging operation was begun at box 620.

At box 690, whether the ranging operation is complete is determined. For example, if the ranging objectives of the operation have been completed (e.g., the identification of a landing site or location, or the construction of a point cloud or depth map with suitable resolution or precision), then the process ends. If the ranging operation is not complete, however, then the process returns to box 650, where the imaging device captures a next image with the propeller blade in a next selected angular orientation, e.g., at a predetermined time, or when the propeller blade reaches the selected angular orientation, and the process repeats itself until the ranging operation is determined to have been completed. Given the high angular velocities typically observed during the operation of a propeller aboard an aerial vehicle (e.g., a UAV), the accuracy of such a point cloud or depth map may be rapidly and precisely refined based on pairs of images captured at high frequencies.

Figure 7:
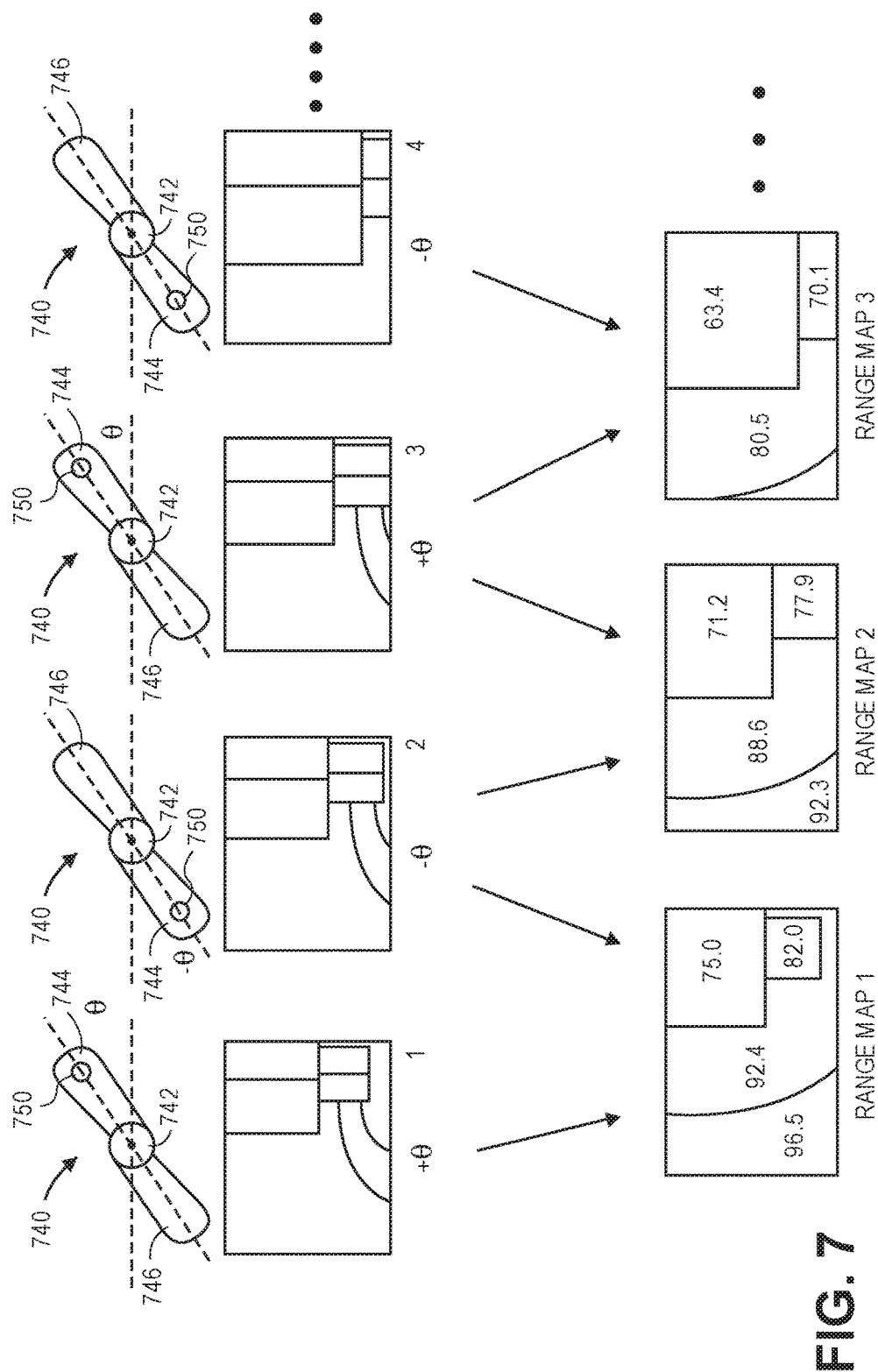
FIG. 7 is a view of aspects of one system for determining stereo distance information using imaging devices integrated into a propeller blade in accordance with embodiments of the present disclosure.

As is discussed above, the systems and methods of the present disclosure may be utilized in conducting any ranging operations using an aerial vehicle, including but not limited to the construction of depth maps of a given region. Referring to FIG. 7, a view of aspects of one system 700 for determining stereo distance information using imaging devices integrated into a propeller blade in accordance with embodiments of the present disclosure is shown. Except where otherwise noted, reference numerals preceded by the number "7" shown in FIG. 7 indicate components or features that are similar to components or features having reference numerals preceded by the number "5" shown in FIG. 5A, FIG. 5B or FIG. 5C, by the number "4" shown in FIG. 4A, FIG. 4B or FIG. 4C, by the number "2" shown in FIG. 2 or by the number "1" shown in FIGS. 1A through 1E.

As is shown in FIG. 7, a propeller 740 having a first blade 744 and a second blade 746 mounted about a hub 742 is shown. The first blade 744 includes an imaging device 750 embedded in one surface thereof. The propeller 740 is configured to rotate about the hub 742 under power, e.g., by one or more motors joined to the hub 742 (not shown).

The imaging device 750 may be configured to capture any number of images at regular angular intervals, and to utilize such images in defining depth maps or other representations of depth or range information. As is shown in FIG. 7, the imaging device 750 captures images 70-1, 70-2, 70-3, 70-4, and so on and so forth, with the first blade 744 aligned at angles of θ and −θ, respectively, with respect to the hub 742. The images 70-1, 70-2, 70-3, 70-4 may then be analyzed to recognize one or more objects therein, and processed to determine ranges to such objects, or ranges to regions of the images corresponding to such objects, according to one or more stereo ranging algorithms or techniques. The ranges determined based on analyses of the images 70-1, 70-2, 70-3, 70-4 may be aggregated into a plurality of depth maps 75-1, 75-2, 75-3, and so on and so forth, which may be iteratively updated using successively captured images in order to determine whether ranges to such objects or regions have changed, and to what extent, thereby effectively constructing a dynamic point cloud, depth map or other three dimensional model of a scene in which the aerial vehicle is operating that changes over time. The images 70-1, 70-2, 70-3, 70-4 may be rotated or otherwise realigned, as necessary, prior to analyzing such images with respect to one another, or prior to searching for the one or more objects therein.

Therefore, in accordance with the present disclosure, dynamic range maps may be created and updated, as necessary, when ranging information is determined using images captured using imaging devices embedded or otherwise integrated into a surface of a blade of a rotating propeller. Where a propeller is rotating at a sufficiently high angular velocity, e.g., on the order of thousands of revolutions per minute (rpm), an imaging device embedded in a blade of the propeller may effectively be present in two locations at once, and images captured by the imaging device in the different locations may be analyzed according to one or more stereo ranging algorithms or techniques in order to derive range information thereof. The ranges may be determined for any reason, including but not limited to identifying a site or location for landing the aerial vehicle (e.g., a sufficiently large, flat and durable surface that may accommodate one or more dimensions of the aerial vehicle), navigating the aerial vehicle (e.g., to identify terrain or contours for navigational purposes), or searching for or avoiding one or more airborne or ground-based objects.

Figure 8A:
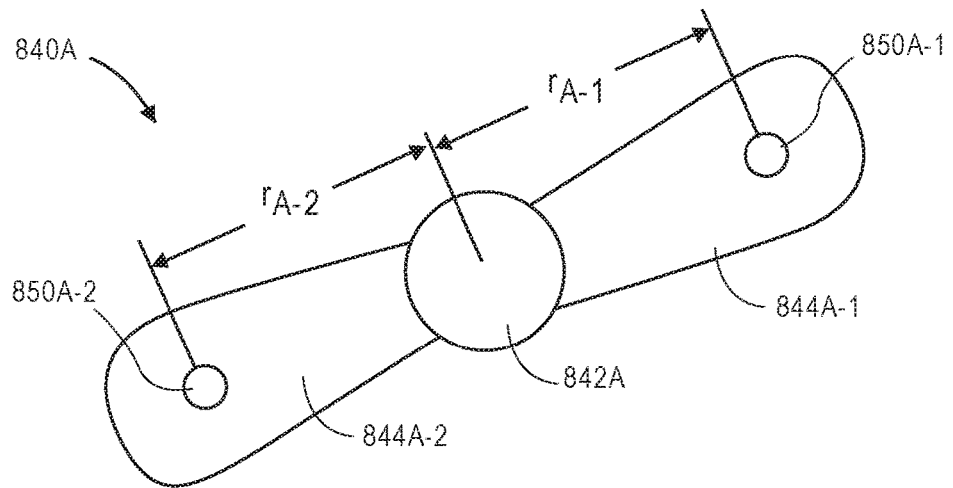
FIG. 8A and FIG. 8B are views of propeller blades having imaging devices integrated therein for determining stereo distance information in accordance with embodiments of the present disclosure.
Figure 8B:
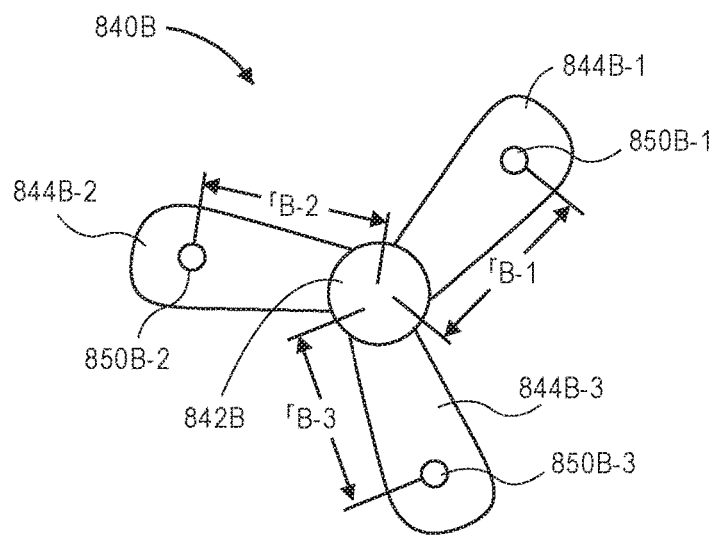

In accordance with the present disclosure, any number of propeller blades may include any number of imaging devices integrated therein, and such imaging devices may be integrated at different radii with respect to hubs to which the propeller blades are mounted. Referring to FIGS. 8A and 8B, views of propeller blades 840A, 840B having imaging devices integrated therein for determining stereo distance information in accordance with embodiments of the present disclosure are shown. Except where otherwise noted, reference numerals preceded by the number "8" shown in FIG. 8A or FIG. 8B indicate components or features that are similar to components or features having reference numerals preceded by the number "7" shown in FIG. 7, by the number "5" shown in FIG. 5A, FIG. 5B or FIG. 5C, by the number "4" shown in FIG. 4A, FIG. 4B or FIG. 4C, by the number "2" shown in FIG. 2 or by the number "1" shown in FIGS. 1A through 1E.

As is shown in FIG. 8A, the propeller 840A includes a hub 842A and a pair of blades 844A-1, 844A-2. The blade 844A-1 includes an imaging device 850A-1 embedded therein at a distance $r_{A-1}$ from the hub 842A. The blade 844A-2 includes an imaging device 850A-2 embedded therein at a distance $r_{A-2}$ from the hub 842A.

The propeller 840A may be utilized to capture depth information in any mode or format. For example, because the imaging devices 850A-1, 850A-2 are positioned at a fixed baseline distance from one another, e.g., a sum of the distances $r_{A-1}$, $r_{A-2}$, the imaging devices 850A-1, 850A-2 may capture images in concert with one another, and such images may be evaluated to determine range information therefrom, e.g., according to one or more stereo ranging algorithms or techniques. Alternatively, the imaging devices 850A-1, 850A-2 may be used to independently capture images that may be analyzed and processed in order to determine range information to any number of points (e.g., points corresponding to surfaces of one or more objects). For example, the imaging device 850A-1 may be configured to capture images when the blade 844A-1 is aligned at one or more predetermined orientations or at one or more predetermined times, and the imaging device 850A-2 may be separately configured to capture images when the blade 844A-2 is aligned at one or more predetermined orientations or at one or more predetermined times. Images captured separately by the respective imaging devices 850A-1, 850A-2 may be used to determine depth information regarding ranges from the respective blades 844A-1, 844A-2 to one or more points. The distances $r_{A-1}$, $r_{A-2}$ need not be equal to one another, and each of the imaging devices 850A-1, 850A-2 may have different capacities, specifications or ratings integrated therein, with such imaging devices being utilized for different purposes accordingly.

As is shown in FIG. 8B, the propeller 840B includes a hub 8423B having three blades 844B-1, 844B-2, 844B-3. The blade 844B-1 includes an imaging device 850B-1 embedded therein at a distance $r_{B-1}$ from the hub 842B. The blade 844B-2 includes an imaging device 850B-2 embedded therein at a distance $r_{B-2}$ from the hub 842B. The blade 844B-3 includes an imaging device 850B-3 embedded therein at a distance $r_{B-3}$ from the hub 842B. As is discussed above with regard to the propeller 840A and the imaging devices 850A-1, 850A-2 of FIG. 8A, the imaging devices 850B-1, 850B-2, 850B-3 may capture images in concert with one another, and such images may be evaluated to determine range information therefrom, e.g., according to one or more stereo ranging algorithms or techniques. A baseline distance between any two of the imaging devices 850B-1, 850B-2, 850B-3 may be determined according to triangle properties and/or traditional trigonometric functions. Alternatively, the imaging devices 850B-1, 850B-2, 850B-3 may be used to independently capture images, e.g., when the blades 844B-1, 844B-2, 844B-3 are aligned at predetermined orientations or at predetermined times, and such images may be analyzed and processed in order to determine range information to one or more points in space. The distances $r_{B-1}$, $r_{B-2}$, $r_{B-3}$ need not be equal to one another. Each of the imaging devices 850B-1, 850B-2, 850B-3 may have different capacities, specifications or ratings integrated therein, with such imaging devices being utilized for different purposes accordingly.

In accordance with the present disclosure, a determination of depth information using images captured by imaging devices integrated into propeller blades aboard aerial vehicles may be augmented by images captured using imaging devices that are integrated into non-rotating portions of an aerial vehicle, such as a frame, a fuselage, a control surface or one or more other components or surfaces thereof. Referring to FIGS. 9A through 9D, views of aspects of one system for determining stereo distance information using imaging devices integrated into propeller blades in accordance with embodiments of the present disclosure are shown. Except where otherwise noted, reference numerals preceded by the number "9" shown in FIG. 9A, FIG. 9B, FIG. 9C or FIG. 9D indicate components or features that are similar to components or features having reference numerals preceded by the number "8" shown in FIG. 8A or FIG. 8B, by the number "7" shown in FIG. 7, by the number "5" shown in FIG. 5A, FIG. 5B or FIG. 5C, by the number "4" shown in FIG. 4A, FIG. 4B or FIG. 4C, by the number "2" shown in FIG. 2 or by the number "1" shown in FIGS. 1A through 1E.

Figure 9A:
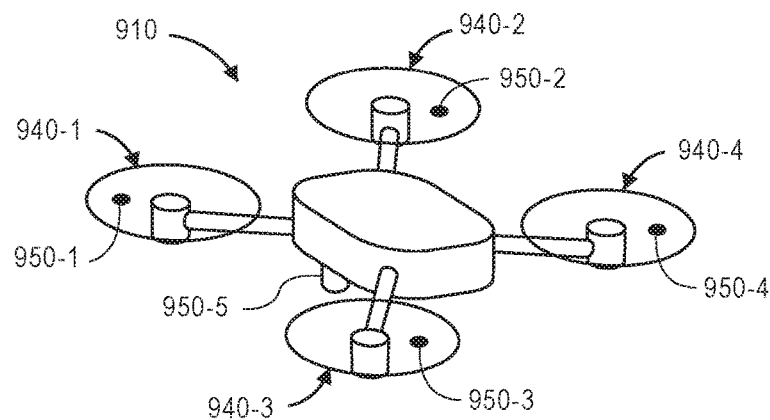
FIGS. 9A through 9D are views of aspects of one system for determining stereo distance information using imaging devices integrated into propeller blades in accordance with embodiments of the present disclosure.

Referring to FIG. 9A, an aerial vehicle 910 includes a control center 920, a plurality of motors 930-1, 930-2, 930-3, 930-4 and a plurality of propellers 940-1, 940-2, 940-3, 940-4, with each of the propellers 940-1, 940-2, 940-3, 940-4 rotatably coupled to one of the motors 930-1, 930-2, 930-3, 930-4. The aerial vehicle 910 further includes a plurality of imaging devices 950-1, 950-2, 950-3, 950-4, 950-5, with each of the imaging devices 950-1, 950-2, 950-3, 950-4 being mounted to a blade of one of the propellers 940-1, 940-2, 940-3, 940-4, and with the imaging device 950-5 being mounted to a frame of the aerial vehicle 910, e.g., beneath the control center 920.

Figure 9B:
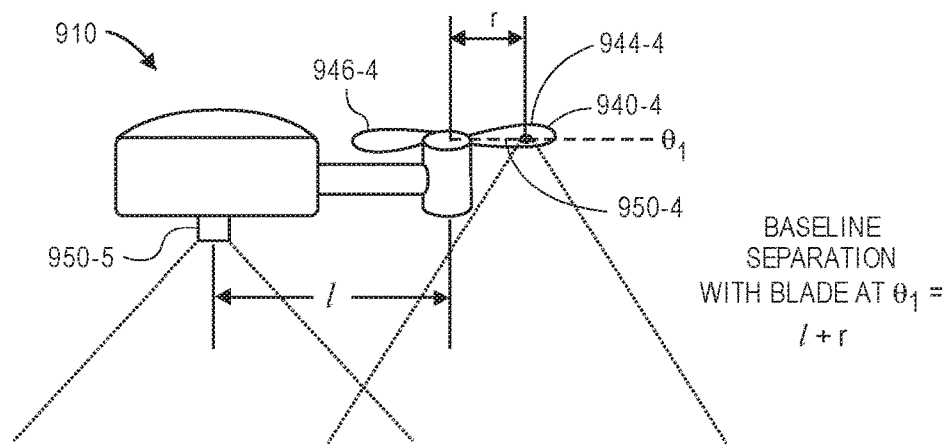
Figure 9C:
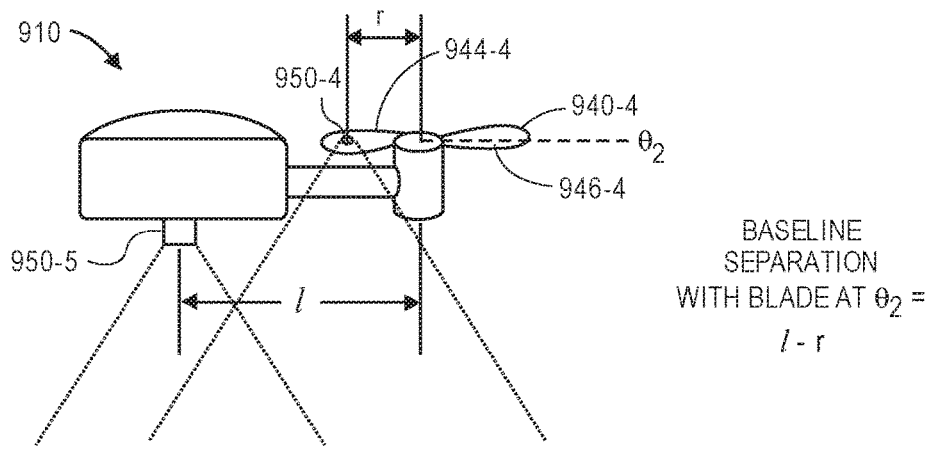

Images captured by the non-rotating imaging device 950-5 may be used in conjunction with images captured by one or more of the rotating imaging devices 950-1, 950-2, 950-3, 950-4 to determine information regarding distances or ranges to points beneath the aerial vehicle 910. For example, as is shown in FIG. 9B, the propeller 940-4 includes a first blade 944-4 and a second blade 946-4 mounted to a hub 942-4 joined to the motor 930-4, with the first blade 944-4 having the imaging device 950-4 embedded therein at a distance r from the hub 942-4. The motor 930-4 and the hub 942-4 are located at a distance l from the non-rotating imaging device 950-5. Thus, a baseline separation between the non-rotating imaging device 950-5 and the rotating imaging device 950-4 when the first blade 944-4 is oriented at the angle $\theta_1$ shown in FIG. 9B is equal to l+r. As is shown in FIG. 9C, a baseline separation between the non-rotating imaging device 950-5 and the rotating imaging device 950-4 when the first blade 944-4 is oriented at the angle $\theta_2$ shown in FIG. 9C is equal to l−r. Any number of other baseline separations may be determined according to triangle properties and/or traditional trigonometric functions based on the angle of orientation of the first blade 944-4.

Therefore, images captured using the non-rotating imaging device 950-5 and the rotating imaging device 950-4, or any of the other rotating imaging devices 950-1, 950-2, 950-3, may be used in making independent determinations of depth information to one or more points beneath the aerial vehicle 910, e.g., by stereo ranging algorithms or techniques. Such determinations may increase the accuracy of the available depth information associated with the aerial vehicle 910, or any depth maps or depth models generated therefrom, and may filter out outlying or inaccurate results determined by stereo ranging algorithms or techniques using images captured by any one of the imaging devices 950-1, 950-2, 950-3, 950-4, 950-5.

Figure 9D:
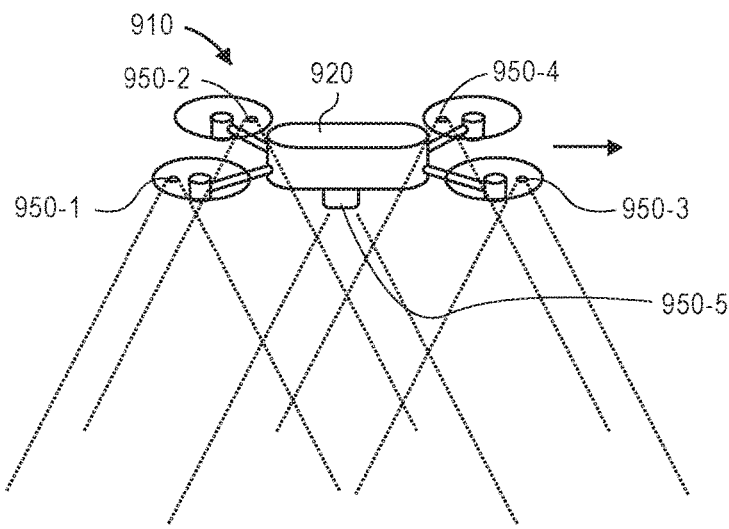
Figure 9D:
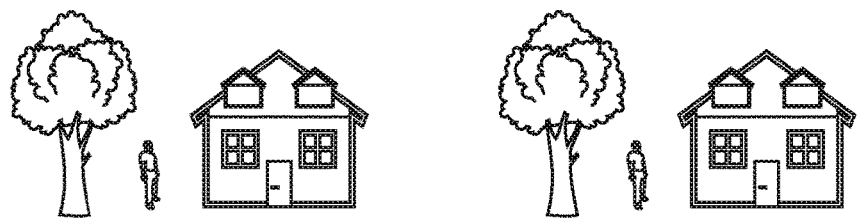

Moreover, any of the imaging devices 950-1, 950-2, 950-3, 950-4, 950-5 may be configured to capture imaging data simultaneously, and any of such imaging data may be processed for any purpose, including but not limited to determining stereo distance information to one or more points beneath the aerial vehicle 910. As is shown in FIG. 9D, the aerial vehicle 910 and/or the control center 920 may operate the imaging devices 950-1, 950-2, 950-3, 950-4, 950-5 separately or in concert to capture still or moving images, and any associated audio information or metadata, regarding any number of points beneath the aerial vehicle 910 that appear in two or more images captured by one or more of the imaging devices 950-1, 950-2, 950-3, 950-4, 950-5.

A propeller having an imaging device integrated into a blade, or a motor for rotating such a propeller about an axis, may further include an imaging device aligned along the axis, and images captured by the respective imaging devices may be used to determine ranges or distances to points according to one or more stereo ranging algorithms or techniques. Referring to FIGS. 10A through 10C, views of aspects of one system for determining stereo distance information using imaging devices integrated into propeller blades in accordance with embodiments of the present disclosure are shown. Except where otherwise noted, reference numerals preceded by the number "10" shown in FIG. 10A, FIG. 10B or FIG. 10C indicate components or features that are similar to components or features having reference numerals preceded by the number "9" shown in FIG. 9A, FIG. 9B, FIG. 9C or FIG. 9D, by the number "8" shown in FIG. 8A or FIG. 8B, by the number "7" shown in FIG. 7, by the number "5" shown in FIG. 5A, FIG. 5B or FIG. 5C, by the number "4" shown in FIG. 4A, FIG. 4B or FIG. 4C, by the number "2" shown in FIG. 2 or by the number "1" shown in FIGS. 1A through 1E.

As is shown in FIGS. 10A through 10C, a motor 1030 includes a propeller 1040 rotatably coupled thereto. The propeller 1040 includes a first blade 1044 and a second blade 1046, and an imaging device 1050-1 is integrated into an underside of the first blade 1044. Additionally, an imaging device 1050-2 is also integrated into an underside of the motor 1030. The imaging device 1050-1 and the imaging device 1050-2 are aligned such that their respective axes of orientation are parallel to one another, and the fields of view of the respective imaging devices 1050-1, 1050-2 intersect and overlap to a significant extent, with the intersection and overlapping beginning at a nominal distance below the motor 1030.

The motor 1030 is configured to rotate the propeller 1040 about an axis that coincides with the axis of orientation of the imaging device 1050-2. Therefore, because the imaging device 1050-1 is integrated into an underside of the first blade 1044 at a distance r from a hub or boss of the propeller 1040, the imaging device 1050-1 and the imaging device 1050-2 remain at the fixed distance r from one another, regardless of an angle of orientation of the first blade 1044. For example, as is shown in FIG. 10A, FIG. 10B and FIG. 10C, whether the first blade 1044 is aligned at a first angle $\theta_1$, a second angle $\theta_2$, or a third angle $\theta_3$. Thus, the propeller 1040 and the motor 1030, and the imaging devices 1050-1, 1050-2 provided thereon, may be utilized to determine stereo distance information to points within fields of view of both of the imaging devices 1050-1, 1050-2 while the first blade 1044 is at any angular orientation, e.g., at one or more of the first angle $\theta_1$, the second angle $\theta_2$, or the third angle $\theta_3$, or at any intervening angle. Furthermore, because the imaging device 1050-2 may be used to continuously or substantially continuously capture images of a scene at high rates of speed, the imaging device 1050-2 may capture images of the scene from different perspectives, thereby enhancing the accuracy of any stereo distance information determined using such images, and improving the resolution of any point clouds, depth models or other representations generated from the stereo distance information.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

As used herein, the terms "forward" flight or "horizontal" flight refer to flight in a direction substantially parallel to the ground (i.e., sea level). As used herein, the term "vertical" flight refers to flight in a direction extending substantially radially outward from a center of the Earth. Those of ordinary skill in the pertinent arts will recognize that flight trajectories may include components of both "forward" flight or "horizontal" flight and "vertical" flight vectors.

Although some of the embodiments disclosed herein reference the use of unmanned aerial vehicles to deliver payloads from warehouses or other like facilities to customers, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3 or 6, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle comprising:
a frame;
a first propulsion motor mounted to the frame, wherein the first propulsion motor is configured to rotate a first shaft about a first axis defined by the first shaft;
a first propeller having a first plurality of blades, wherein the first propeller is rotatably coupled to the first shaft;
a first digital camera embedded in an underside of a first one of the first plurality of blades; and
at least one computer processor,
wherein the at least one computer processor is configured to at least:
cause the first propulsion motor to rotate the first propeller at a first predetermined speed;
cause the first digital camera to capture a first digital image at a first time, wherein the first blade having the first digital camera embedded therein is aligned in a first angular orientation at the first time;
cause the first digital camera to capture a second digital image at a second time, wherein the first blade having the first digital camera embedded therein is aligned in a second angular orientation at the second time;
determine a baseline distance between a first position of the first digital camera at the first time and a second position of the first digital camera at the second time;
recognize a first representation of a portion of an object below the unmanned aerial vehicle within at least a portion of the first image;
recognize a second representation of the portion of the object below the unmanned aerial vehicle within at least a portion of the second image;
determine a first position of the portion of the object based at least in part on the baseline distance, a focal length of the first digital camera, the first representation and the second representation; and
determine a first distance to the portion of the object below the unmanned aerial vehicle based at least in part on the first position.

2. The unmanned aerial vehicle of claim 1, wherein the at least one computer processor is further configured to at least:
define a first line extending from the first position of the imaging device through the first representation of the portion of the object;
define a second line extending from the second position of the imaging device through the second representation of the portion of the object; and
identify an intersection of the first line and the second line,
wherein the first position of the portion of the object is determined based at least in part on the intersection of the first line and the second line.

3. The unmanned aerial vehicle of claim 1, wherein the at least one computer processor is further configured to at least:
select at least one of the second angular orientation or the second time based at least in part on the first predetermined speed.

4. The unmanned aerial vehicle of claim 1, further comprising:
a second propulsion motor mounted to the frame, wherein the second propulsion motor is configured to rotate a second shaft about a second axis defined by the second shaft; and
a second propeller having a second plurality of blades, wherein the second propeller is rotatably coupled to the second shaft.

5. A method comprising:
capturing a first image of at least a portion of a scene by a first imaging device at a first time, wherein the first imaging device is integrated into a first surface of a first blade of a first propeller of a first aerial vehicle at a first radius from a first hub of the first propeller, and wherein the first propeller is rotating at a first angular velocity about a first axis of rotation at the first time;
capturing a second image of at least the portion of the scene by the first imaging device at a second time, wherein the first propeller is rotating at the first angular velocity about the first axis of rotation at the second time;
recognizing at least one point of the scene in the first image by at least one computer processor;
recognizing the at least one point of the scene in the second image by the at least one computer processor; and
determining a first range to the at least one point of the scene based at least in part on the first image and the second image by the at least one computer processor.

6. The method of claim 5, further comprising:
determining a first position of the first imaging device at the first time;
determining a second position of the first imaging device at the second time; and
determining a baseline distance between the first position and the second position,
wherein the first range to the at least one point of the scene is determined based at least in part on the baseline distance.

7. The method of claim 6, wherein the first blade is in a first angular orientation at the first time,
wherein the first blade is in a second angular orientation at the second time,
wherein the second angular orientation is approximately one hundred eighty degrees apart from the first angular orientation, and
wherein the baseline distance is approximately twice the first radius.

8. The method of claim 6, wherein recognizing the at least one point of the scene in the first image comprises:
identifying a first representation of the at least one point of the scene in the first image by the at least one computer processor,
wherein recognizing the at least one point of the scene in the second image comprises:
identifying a second representation of the at least one point of the scene in the second image by the at least one computer processor, and
wherein determining the first range to the portion of the object comprises:
defining a first epipolar line from the first position through the first representation by the at least one computer processor;
defining a second epipolar line from the second position through the second representation by the at least one computer processor;

determining a position of an intersection of the first epipolar line and the second epipolar line by the at least one computer processor; and determining the first range to the object based at least in part on the position of the intersection of the first epipolar line and the second epipolar line by the at least one computer processor.

9. The method of claim 5, further comprising:

determining a first angular orientation of the first blade at the first time; and determining a second angular orientation of the first blade at the second time, wherein determining the first range to the at least one point of the scene based at least in part on the first image and the second image comprises:

aligning the first image and the second image with respect to one another based on a difference between the first angular orientation and the second angular orientation.

10. The method of claim 5, wherein recognizing the at least one point of the scene in the first image comprises:

recognizing a plurality of points of the first image by the at least one computer processor, wherein recognizing the at least one point of the scene in the second image comprises:

recognizing portions of at least some of the plurality of objects in the second image by the at least one computer processor, and wherein determining the first range to the at least one point of the scene comprises:

determining ranges to the at least some of the plurality of points of the scene based at least in part on the first image and the second image by the at least one computer processor, wherein the first range is one of the ranges; and defining a point cloud for the scene based at least in part on the ranges, wherein the depth map represents distances to each of a plurality of regions, and wherein each of the regions of the depth map corresponds to one of the portions of the at least some of the plurality of objects.

11. The method of claim 10, further comprising:

selecting, by at least one computer processor, a landing site for the first aerial vehicle based at least in part on the point cloud.

12. The method of claim 5, further comprising capturing a third image of at least the portion of the scene by a second imaging device at the first time or the second time, wherein the second imaging device is integrated into a second surface of a second blade of the first propeller at a second radius from the first hub;

recognizing the at least one point of the scene in the third image by the at least one computer processor; and determining a second range to the at least one point of the scene based at least in part on the third image and one of the first image or the second image by the at least one computer processor.

13. The method of claim 5, further comprising:

capturing a third image of at least the portion of the scene by a second imaging device at the first time or the second time, wherein the second imaging device is integrated into a second surface of at least one of a frame of the first aerial vehicle or a first motor rotatably coupled to the first propeller;

recognizing the at least one point of the scene in the third image by the at least one computer processor; and determining a second range to the at least one point of the scene based at least in part on the third image and one of the first image or the second image.

14. The method of claim 5, further comprising:

capturing a third image of at least the portion of the scene by a second imaging device at one of the first time or the second time, wherein the second imaging device is integrated into a second surface of a second blade of a second propeller of the first aerial vehicle at a second radius from a second hub of the second propeller, and wherein the second propeller is rotating at a second angular velocity;

recognizing the at least one point of the scene in the third image by the at least one computer processor; and determining a second range to the at least one point of the scene based at least in part on the third image and one of the first image or the second image.

15. The method of claim 5, wherein a difference between the first time and the second time is approximately one-hundredth of one second.

16. The method of claim 5, wherein the first angular velocity is at least three thousand revolutions per minute.

17. A propeller comprising:

a hub configured for mounting to a shaft of a propulsion motor, wherein the shaft defines an axis of rotation;

a first blade joined to the hub; and a first imaging device embedded within a first surface of the first blade at a first radius from the hub, wherein the first imaging device comprises a first lens having a first axis of orientation aligned substantially parallel to the axis of rotation defined by the shaft.

18. The propeller of claim 17, wherein the propeller is rotatably mounted to the shaft of the propulsion motor, wherein the first imaging device is configured to capture a first image at a first time or with the first blade aligned at a first angular orientation, and wherein the first imaging device is configured to capture a second image at a second time or with the first blade aligned at a second angular orientation.

19. The propeller of claim 18, wherein the first orientation is one hundred eighty degrees from the second orientation.

20. The propeller of claim 17, further comprising:

a second blade joined to the hub; and a second imaging device embedded within a second surface of the second blade at a second radius from the hub, wherein the second imaging device comprises a second lens having a second axis of orientation aligned substantially parallel to the axis of rotation defined by the shaft.

* * * * *